United States Patent
Evans

(10) Patent No.: US 11,339,939 B2
(45) Date of Patent: May 24, 2022

(54) REMOTELY OPERABLE LIGHT BAR TILTING SYSTEM

(71) Applicant: Eversen Performance Products, LLC, Santa Ana, CA (US)

(72) Inventor: John T. Evans, Santa Ana, CA (US)

(73) Assignee: Eversen Performance Products, LLC, Santa Ana, CA (US)

( * ) Notice: Subject to any disclaimer, the term of this patent is extended or adjusted under 35 U.S.C. 154(b) by 0 days.

(21) Appl. No.: 17/378,279

(22) Filed: Jul. 16, 2021

(65) Prior Publication Data

US 2022/0018513 A1 Jan. 20, 2022

Related U.S. Application Data

(60) Provisional application No. 63/053,627, filed on Jul. 18, 2020.

(51) Int. Cl.
| | |
|---|---|
| *F21S 41/657* | (2018.01) |
| *B60Q 1/076* | (2006.01) |
| *F21S 4/28* | (2016.01) |
| *F21V 21/30* | (2006.01) |

(52) U.S. Cl.
CPC ............ *F21S 41/657* (2018.01); *B60Q 1/076* (2013.01); *F21S 4/28* (2016.01); *F21V 21/30* (2013.01); *B60Q 2200/36* (2013.01)

(58) Field of Classification Search
CPC .......... F21V 21/30; F21S 4/28; F21S 41/657; B60Q 1/076
See application file for complete search history.

(56) References Cited

U.S. PATENT DOCUMENTS

| | | | | |
|---|---|---|---|---|
| 5,558,424 | A * | 9/1996 | Zeligson | B60Q 1/2611 362/286 |
| 9,802,530 | B2 * | 10/2017 | Kim | B60Q 1/2611 |
| 2012/0113666 | A1 * | 5/2012 | Slipp | B60Q 1/2657 362/523 |
| 2015/0146449 | A1 * | 5/2015 | Freiser | F21V 23/023 362/523 |

* cited by examiner

*Primary Examiner* — Thomas M Sember
(74) *Attorney, Agent, or Firm* — UltimatEdge IP Law Group, P.C.; Dean G. Stathakis

(57) ABSTRACT

The present specification discloses a remotely operated light bar tilting system that adjusts the tilt angle of a light source about an attachment base mounted to a vehicle or other structure. A remotely operated light bar tilting system disclosed herein comprises an actuator coupled to and rotates with the light source to adjust the tilt of the light source by pushing or pulling on a linkage assembly that transmits a force from the actuator to an attachment base. The linkage assembly can include a ternary link or other similar link or assembly of links that can transmit force to the attachment base for tilting the light source. The tilting mechanism is entirely supported by the attachment base creating a compact system that does not require the actuator be mounted to a separate base on the vehicle.

21 Claims, 8 Drawing Sheets

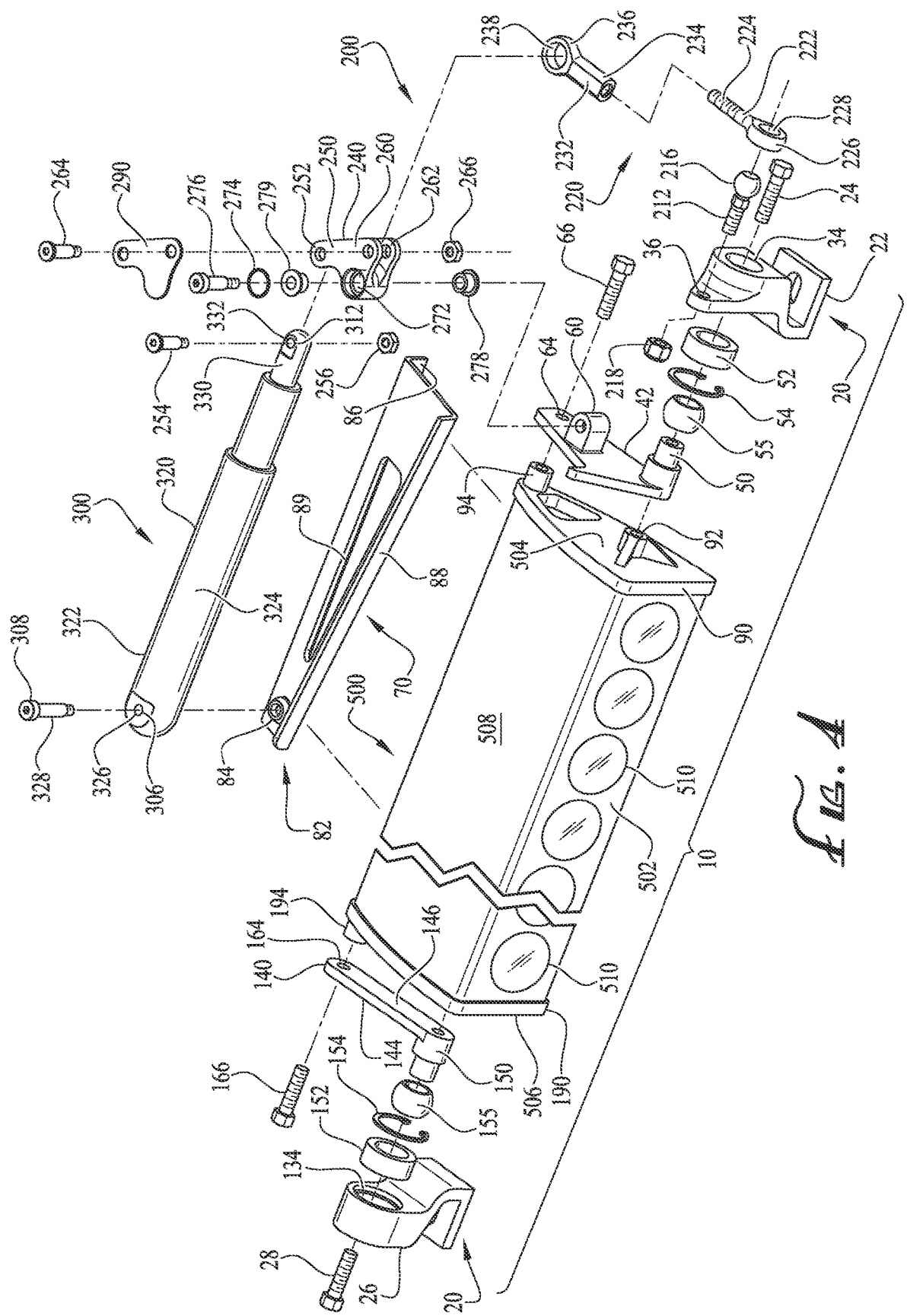

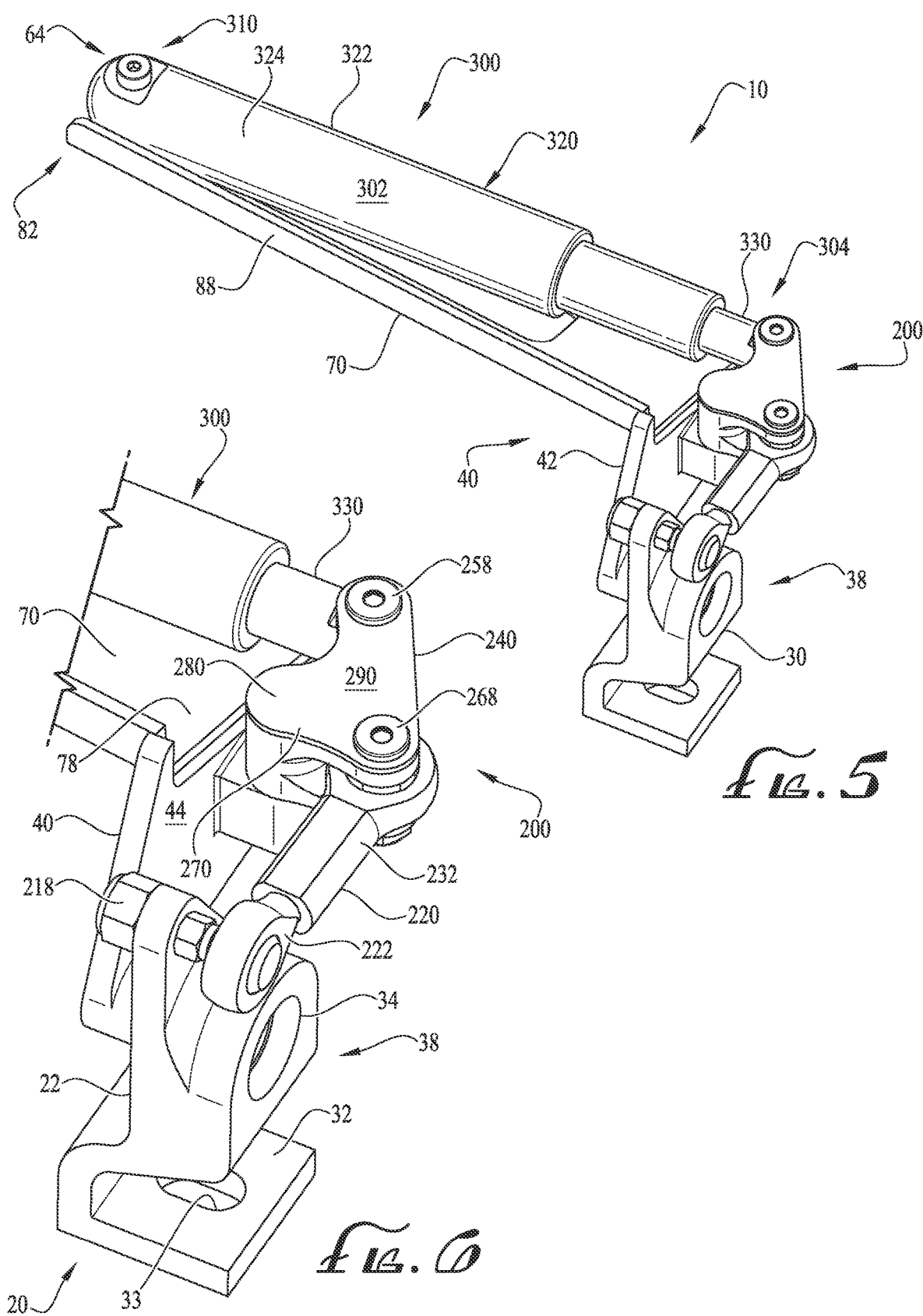

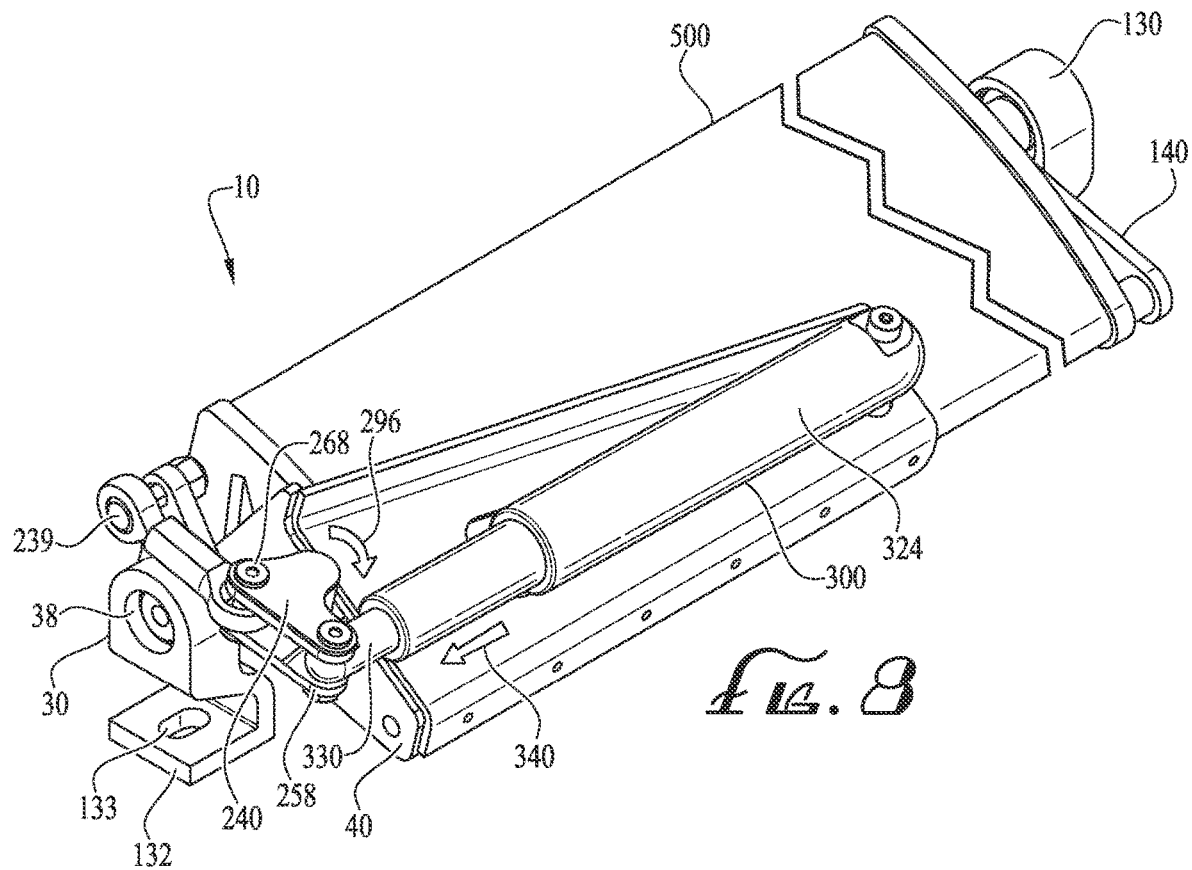
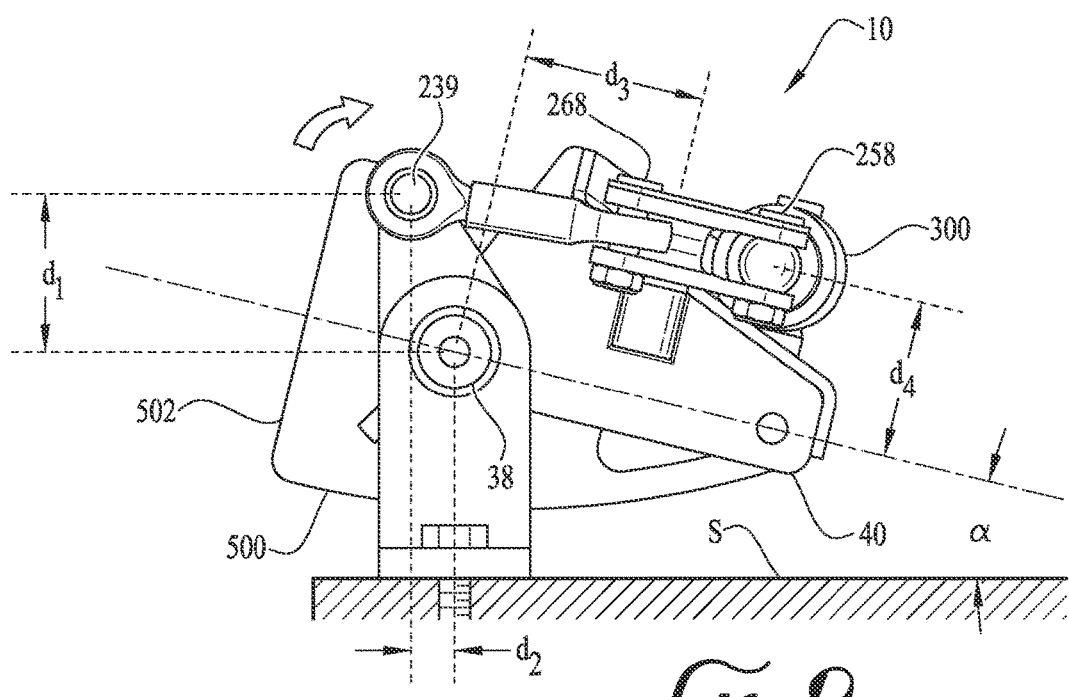

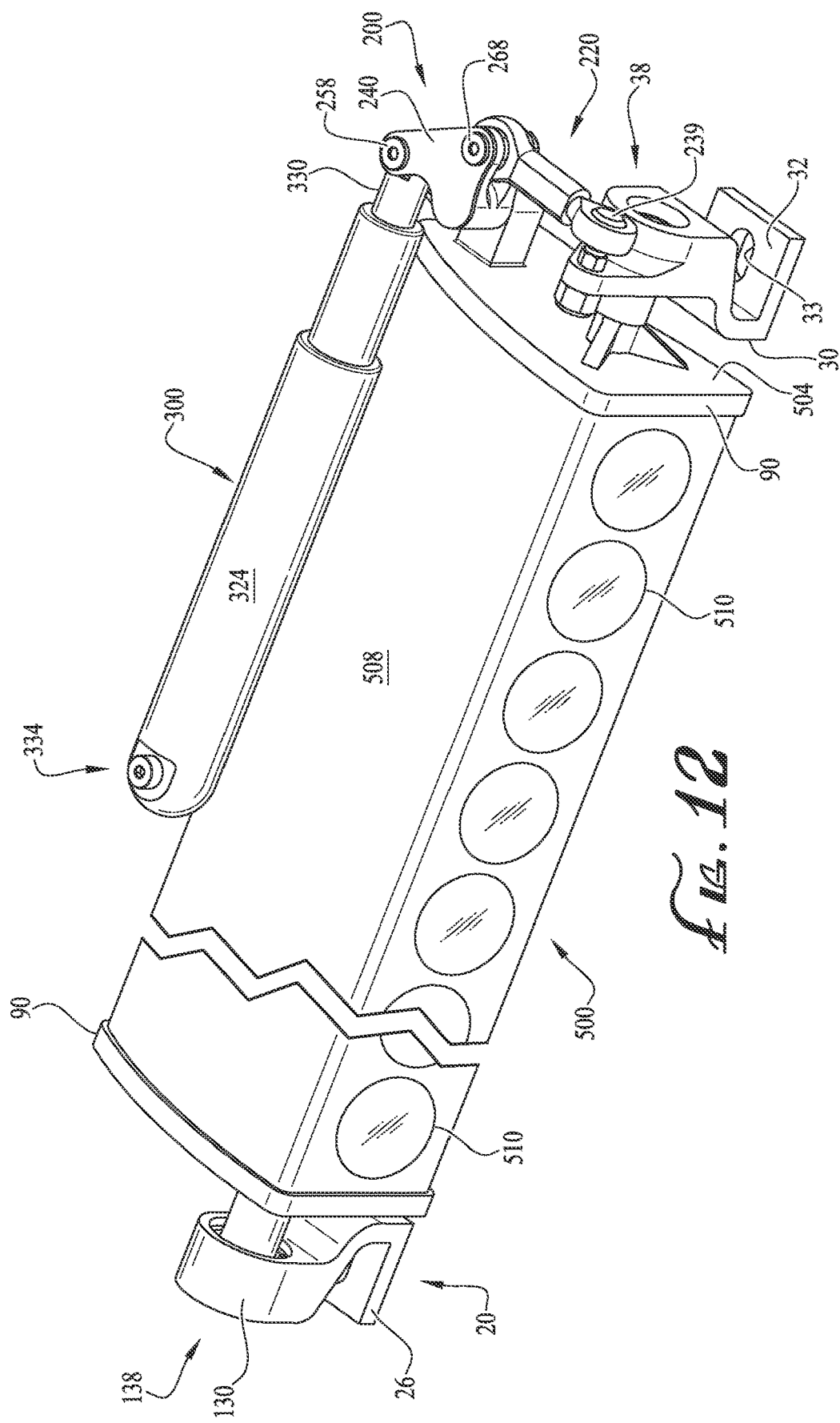

REMOTELY OPERABLE LIGHT BAR TILTING SYSTEM

This application claims the benefit of priority and is entitled to the filing date pursuant to 35 U.S.C. § 119(e) of U.S. Provisional Patent Application 63/053,627, filed Jul. 18, 2020, the content of which is hereby incorporated by reference in its entirety.

BACKGROUND

The subject of this patent application relates generally to devices for changing the orientation of a light source mounted to a vehicle or other stationary or mobile platform.

By way of background, in off-road vehicles, work vehicles, or other equipment and/or structures, a light bar or other high-intensity light source is a critical piece of equipment for supplementing or replacing a vehicle's lighting system when operating at night. In operation, the tilt of a light bar needs to be adjusted to permit the operator to illuminate the environment nearest the vehicle, furthest from the vehicle, or at any point therebetween. In addition, a light bar is typically secured to the roof of a vehicle. This increased height profile makes the light bar prone to damage when, for example, parking the vehicle in a structure, such as a garage. Alternatively, a light bar can be dismantled from the vehicle before parking, a tedious and time-consuming process.

To address some of these concerns, both manual and remotely operated light bar titling systems have been developed. Current systems allow a user to adjust the tilt of the light beams while in operation. In addition, such systems enable the light bar to be stowed away to protect the bar for damage and reduce the profile of a vehicle when parking in a structure. However, current systems have several drawbacks. For example, manual light bar tilting systems require the user to stop the vehicle and physically adjust the mounting bracket to alter the tilt of the light bar. Similarly, a user must stop the vehicle to manually stow away a light bar when parking in a structure. Both procedures typically require tools to make such manual adjustments.

Although remotely operable light bar tilting systems enable remote movement a light bar while in operation, current remotely operable mechanisms having several disadvantages. First, the actuators in these remotely operable light bar titling systems are positioned perpendicular to the light bar in order to properly tilt the bar in operation. Such positioning necessitate the placement of component parts some distance away from the light bar creating a bulky profile to the vehicle that is aesthetically displeasing. The placement of the component parts can also monopolies significant portions of a storage area of the vehicle, for example, a trunk or flat-bed area, making it difficult and cumbersome to store items effectively and easily in the storage area. Furthermore, these remotely operable light bar titling systems generally require professional installation as component parts are permanently attached to a vehicle, such as, e.g., by welding components of the light bar system to the vehicle. As such, what is needed is a remotely operable light bar tilting system that is compact, easy to remotely adjust a light bar or other light source tilt, and steadily holds the desired tilt during jolts, vibrations, and other rough conditions while the vehicle is in operation.

Aspects of the present invention fulfill these needs and provide further related advantages as described in the following summary.

SUMMARY

Aspects of the present invention teach certain benefits in construction and use which give rise to the exemplary advantages described below.

The present specification discloses a remotely operable light bar tilting system. In aspects, the disclosed light bar tilting system comprising a tilting mechanism for a light bar that includes in at least one example embodiment an attachment base, an actuator, and a linkage. The attachment base has a pivot, where the attachment base is configured to support at least part of the light bar at the pivot and permit rotation of the light bar relative to the attachment base about the pivot. The actuator has a first portion movable relative to a second portion, where the actuator is configured to be operably coupled with the light bar by the first portion. The linkage connects the actuator to the attachment base; and the linkage is coupled to the second portion of the actuator at a first joint and coupled to the attachment base at a final joint. When assembled, the actuator is substantially parallel to a light bar. Upon actuation, the first portion of the actuator moves relative to the second portion to transmit a force through the linkage to cause the light bar to rotate, where the actuator wholly and at least a part of the linkage rotates about the pivot with the light bar.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings, which are incorporated in and constitute a part of this specification, illustrate aspects of the disclosed subject matter in at least one of its exemplary embodiments, which are further defined in detail in the following description. Features, elements, and aspects of the disclosure are referenced by numerals with like numerals in different drawings representing the same, equivalent, or similar features, elements, or aspects, in accordance with one or more embodiments. The drawings are not necessarily to scale, emphasis instead being placed upon illustrating the principles herein described and provided by exemplary embodiments of the invention. In such drawings:

FIG. 4 is an exploded top front perspective of the remotely operable light bar tilting system of FIG. 1;

FIG. 5 is a top front perspective of the remotely operable light bar tilting system of FIG. 2;

FIG. 6 is a is a partial magnified perspective view of the remotely operable light bar tilting system of FIG. 5, illustrating the linkage assembly;

FIG. 8 is a top back perspective of the remotely operable light bar tilting system of FIG. 1, illustrating the light bar tilted up by an angle α;

FIG. 9 is a side view of the remotely operable light bar tilting system of FIG. 8;

FIG. 12 is a top front perspective of yet another exemplary embodiment of a remotely operable light bar tilting system, with the linkage assembly and the actuator coupled directly to a modified light bar without necessarily requiring intervening components.

Figure 1:
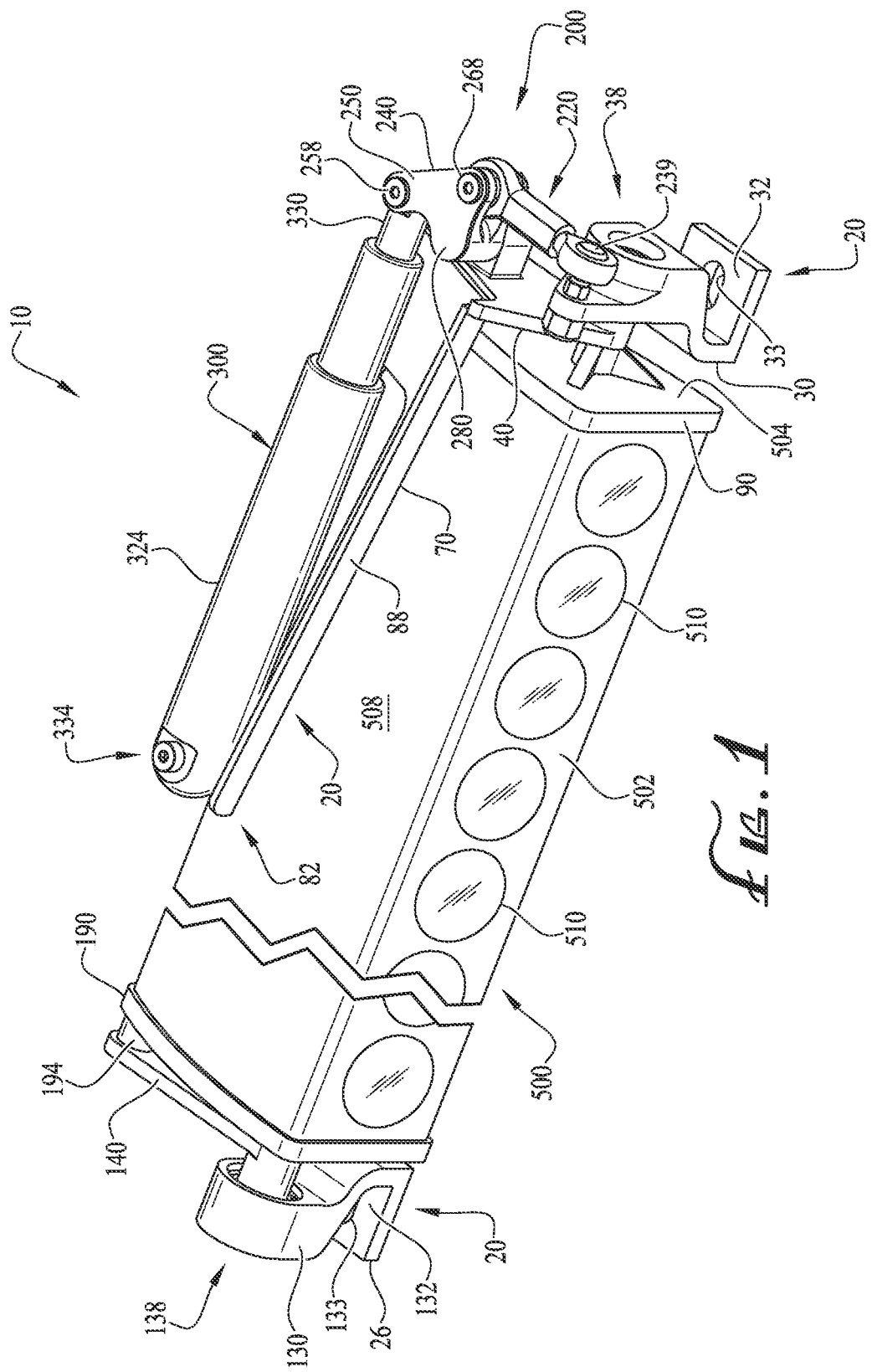
FIG. 1 is a top front perspective of an exemplary embodiment of a remotely operable light bar tilting system disclosed herein.

| Listing of Reference Numbers Associated with Drawings | |
|---|---|
| Ref. No. | Element |
| 10 | Remotely operable light bar tilting system |
| 20 | Attachment base of light bar tilting system 10 |
| 22 | First attachment base of light bar tilting system 10 |
| 24 | Shaft screw of first attachment base 22 |
| 26 | Second attachment base of light bar tilting system 10 |
| 28 | Shaft screw of second attachment base 26 |
| 30 | First support mount of first attachment base 22 |
| 32 | First support mount base of first support mount 30 |
| 33 | First slot of first support mount 30 |
| 34 | First bearing mount through hole of first support mount 30 |
| 36 | Connector through hole of first support mount 30 (part of ball stud joint or final joint 239) |
| 38 | First pivot joint of first support mount 30 |
| 40 | First light bar mount of first attachment base 22 |
| 42 | First light bar mounting plate of first light bar mount 40 |
| 44 | First side of first light bar mounting plate 42 |
| 46 | Second side of first light bar mounting plate 42 |
| 50 | First hollow boss of first light bar mounting plate 42 |
| 52 | First bearing of first hollow boss 50 |
| 54 | First retaining ring of bearing 52 |
| 55 | First ball of bearing 52 |
| 60 | Rocker mount of light bar mounting plate 42 (part of rocker mount arm joint or second joint 280) |
| 62 | Threaded blind hole of rocker mount 60 |
| 64 | Through hole of first light bar mounting plate 42 |
| 66 | First light bar mount screw of first light bar mounting plate 42 |
| 70 | Actuator support of first support mount 30 |
| 72 | Actuator support body of actuator support 70 |
| 74 | First surface of body 72 |
| 76 | Second surface of body 72 |
| 78 | First side of body 72 |
| 80 | Second side of body 72 |
| 81 | Proximal end of body 72 |
| 82 | Distal end of body 72 |
| 84 | Threaded nut of actuator support 70 |
| 86 | First flange of body 72 |
| 88 | Second flange of body 72 |
| 89 | Cutout of actuator support 70 |
| 90 | First light bar mounting plate of first attachment base 22 (optional) |
| 92 | First pivot mounting boss of first light bar mounting plate 90 |
| 94 | First mounting boss of first light bar mounting plate 90 |
| 130 | Second support mount of second attachment base 26 |
| 132 | Second support mount base of second support mount 130 |
| 133 | Second slot of second support mount 130 |
| 138 | Second pivot joint of second support mount 130 |
| 140 | Second light bar mount of second attachment base 26 |
| 142 | Second light bar mounting plate of second light bar mount 140 |
| 144 | First side of second light bar mounting plate 142 |
| 146 | Second side of second light bar mounting plate 142 |
| 150 | Second hollow boss of second light bar mounting plate 142 |
| 152 | Second bearing of second hollow boss 150 |
| 154 | Second retaining ring of second bearing 152 |
| 155 | First ball of bearing 152 |
| 164 | Through hole of second light bar mounting plate 142 |
| 166 | Second light bar mount screw of second light bar mount 140 |
| 190 | Second light bar mounting plate of second attachment base 26 (optional) |
| 192 | Second pivot mounting boss of second light bar mounting plate 67 |
| 194 | Second mounting boss of second light bar mounting plate 67 |
| 200 | Linkage assembly of light bar tilting system 10 |
| 210 | Connector link of linkage assembly 200 |
| 212 | Ball stud connector link of linkage assembly 200 |
| 214 | Threaded body of ball stud connector link 212 |
| 216 | Ball of ball stud connector link 212 |
| 218 | Ball stud nut of ball stud connector link 212 |
| 220 | Straight link of linkage assembly 200 |
| 222 | Male rod component of straight link 220 |

-continued

Listing of Reference Numbers Associated with Drawings

| Ref. No. | Element |
|---|---|
| 224 | Male rod threaded portion of male rod component 222 |
| 226 | Male rod joint portion of male rod component 222 |
| 228 | Male rod eyehole of male rod component 222 |
| 232 | Female rod component of straight link 220 |
| 234 | Female rod hollow boss portion of female rod component 232 |
| 236 | Female rod joint portion of female rod component 232 |
| 238 | Female rod eyehole of female rod component 232 |
| 239 | Connector joint (or final joint) of straight link 220 |
| 240 | Ternary link of linkage assembly 200 |
| 250 | Actuator arm of ternary link 240 |
| 252 | Actuator clevis of actuator arm 250 (part of actuator arm joint or first joint) |
| 254 | Actuator arm screw of actuator arm joint or first joint 258 |
| 256 | Actuator arm nut of actuator arm joint or first joint 258 |
| 258 | Actuator arm joint or first joint of ternary link 240 |
| 260 | Straight link arm of ternary link 240 |
| 262 | Straight link clevis of straight link arm 130 (part of straight link arm joint or third joint 268) |
| 264 | Straight link arm screw of straight link arm joint or third joint 268 |
| 266 | Straight link arm nut of straight link arm joint or third joint 268 |
| 268 | Straight link arm joint or third joint of ternary link 240 |
| 270 | Rocker mount arm of ternary link 240 |
| 272 | Rocker pivot through hole of ternary link 240 |
| 274 | Rocker mount arm 0-ring of rocker mount arm joint or second joint 280 |
| 276 | Rocker mount arm screw of rocker mount arm joint or second joint 280 |
| 278 | Rocker mount arm bushing of rocker mount arm joint or second joint 280 |
| 279 | Rocker mount arm bushing of rocker mount arm joint or second joint 280 |
| 280 | Rocker mount arm joint or second joint of ternary link 240 |
| 290 | Cover plate of ternary link 240 |
| 292 | First through hole of cover plate 290 |
| 294 | Second through hole of cover plate 290 |
| 296 | Direction arrow |
| 300 | Actuator of light bar tilting system 10 |
| 302 | Housing of actuator 300 |
| 304 | First portion of housing 302 |
| 306 | Actuator support mounting through hole of first portion 304 (part of actuator joint 314) |
| 308 | Actuator support mounting screw of mounting through hole 306 |
| 310 | Second portion of housing 302 |
| 312 | Ternary link mounting through hole of second portion 310 (part of actuator joint 314) |
| 314 | Actuator joint of actuator 300 |
| 320 | Linear actuator of light bar tilting system 10 |
| 322 | Housing of actuator 320 |
| 324 | Sleeve portion of actuator 320 |
| 326 | Actuator support mounting through hole of sleeve portion 324 (part of actuator joint 64) |
| 328 | Actuator support mounting screw of mounting hole 326 |
| 330 | Piston portion of actuator 320 |
| 332 | Ternary link mounting through hole of piston portion 330 (part of actuator joint 334) |
| 334 | Actuator joint of actuator 320 |
| 340 | Direction arrow |
| 350 | Direction arrow |
| 500 | Light bar |
| 502 | Front face of light bar 500 |
| 510 | Light emitting elements of light bar 500 |
| 504 | First side of light bar 500 |
| 506 | Second side of light bar 500 |
| 508 | Top surface of light bar 500 |

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

The detailed descriptions set forth below in connection with the appended drawings are intended as a description of embodiments of the invention, and is not intended to represent the only forms in which the present invention may be constructed and/or utilized. The descriptions set forth the structure and the sequence of steps for constructing and operating the invention in connection with the illustrated embodiments. It is to be understood, however, that the same or equivalent structures and steps may be accomplished by different embodiments that are also intended to be encompassed within the spirit and scope of the invention.

The present system in one or more embodiments provides a remotely operable light bar tilting system including a tilting mechanism for adjusting the rotational angle of a light source, such as a light bar. A remotely operable light bar tilting system disclosed herein includes an attachment base supporting the light bar and an actuator and a linkage system that enables selective rotation of the light bar. Both the actuator and linkage system rotate with the light bar about a pivot on the attachment base. A linkage system connects the actuator to the attachment base at a point offset from the pivot, so that the force of the actuator is transmitted through the linkage system and to the attachment base to rotate the light bar about the pivot. In this way, the actuator is located substantially parallel to the light bar and the remotely operable light bar tilting system is entirely supported by the attachment base, creating a compact system that does not require the actuator be mounted to a separate base on the vehicle.

A remotely operable light bar tilting system disclosed herein comprises a tilting mechanism for adjusting the rotational angle of a light source, such as a light bar. In some embodiments, remotely operable light bar tilting system disclosed herein is mounted to an off-road vehicle (for example, to a roll cage or other support structure).

A remotely operable light bar tilting system disclosed herein comprises an attachment base, a linkage system, and an actuator. The mounting can be direct or through an intermediate bracket, structure, or the like. In some embodiments, and as illustrated in FIGS. 1-12, a remotely operable light bar tilting system 10 comprises an attachment base 20, a linkage system 200 and an actuator 300. Remotely operable light bar tilting system 10 is attached to a vehicle and used to secure a light bar 500 to a vehicle.

An attachment base disclosed herein, or at least a component part therein, is the attachment point of a remotely operable light bar tilting system disclosed herein to a vehicle. An attachment base disclosed herein also supports a linkage system disclosed herein, an actuator disclosed herein, as well as a light bar disclosed herein. An attachment base disclosed herein can comprise a single attachment base or a plurality of attachment bases. In some embodiments, and referring to FIG. 1, attachment base 20 comprises a first attachment base 22 including a shaft screw 24 and a second attachment base 26 including a shaft screw 28. In these embodiments, first and second attachment bases 22, 26 are positioned at each end of light bar 500 and supports light bar 500. Each of first and second attachment bases 22, 26 includes a first pivot 38 and a second pivot 138 respectively, upon which linkage assembly 200, actuator 300, and light bar 500 are supported and rotate about.

In some embodiments, and referring to FIGS. 5 & 6, attachment base 20 comprises only a first attachment base 22 including a shaft screw 24 and a second attachment base 26 including a shaft screw 28. In these embodiments, first attachment bases 22 is positioned at one end of light bar 500 and supports light bar 500.

A linkage system disclosed herein comprises one or more interconnected links designed to transfer the force initiated from an actuator disclosed herein to an attachment base disclosed herein thereby causing a light bar to tilt. In some embodiments, and referring to FIG. 1, linkage assembly 200 comprises a straight link 220 and a ternary link 240.

An actuator disclosed herein provides the force necessary to operate the titling mechanism disclosed herein. In some embodiments, actuator 300 comprises a housing 302 including a first portion 304 and a second portion 310. In aspects of these embodiments, first portion 304 can include an actuator support mounting through hole 306 and an actuator support mounting screw 308, and second portion 310 can include a ternary link mounting through hole 312. In some embodiments, actuator 300 is a linear actuator 320 comprises a housing 322 including a sleeve portion 324 and a piston portion 330. In aspects of these embodiments, sleeve portion 324 can include an actuator support mounting through hole 326 and an actuator support mounting screw 328, and piston portion 330 can include a ternary link mounting through hole 332. An actuator disclosed herein can further comprises a control system and a power source.

A light bar discloses herein refers to a light bar designed for use with a vehicle, including a land vehicle like a car or truck, a seacraft like a boat or an aircraft like an airplane or helicopter. In some embodiments, light bar 500 comprises a front face 502, a first side 504, a second side 506 and a top surface 508. Front face 502 includes one or more light emitting elements 510.

Figure 2:
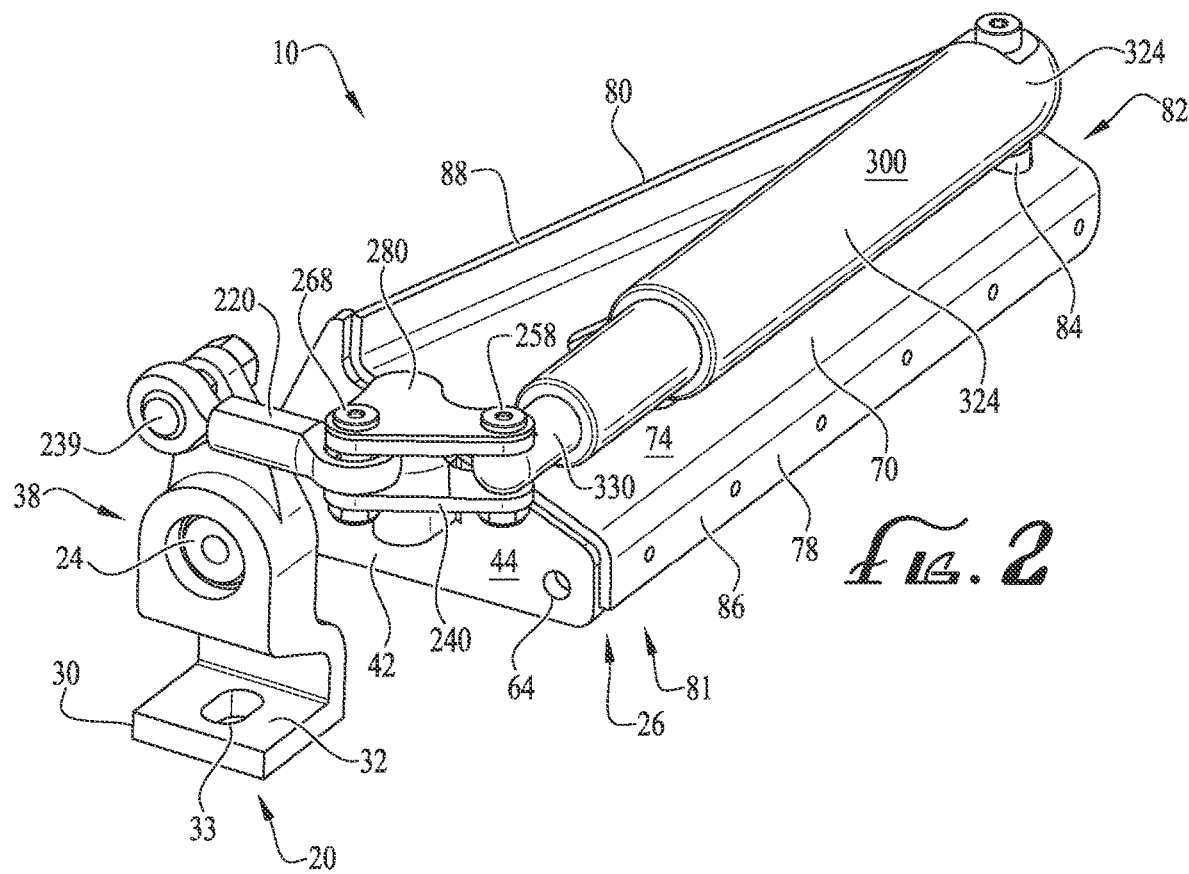
FIG. 2 is a top back perspective of the remotely operable light bar tilting system of FIG. 1, illustrated without the second attachment base assembly and without the light bar.
Figure 3:
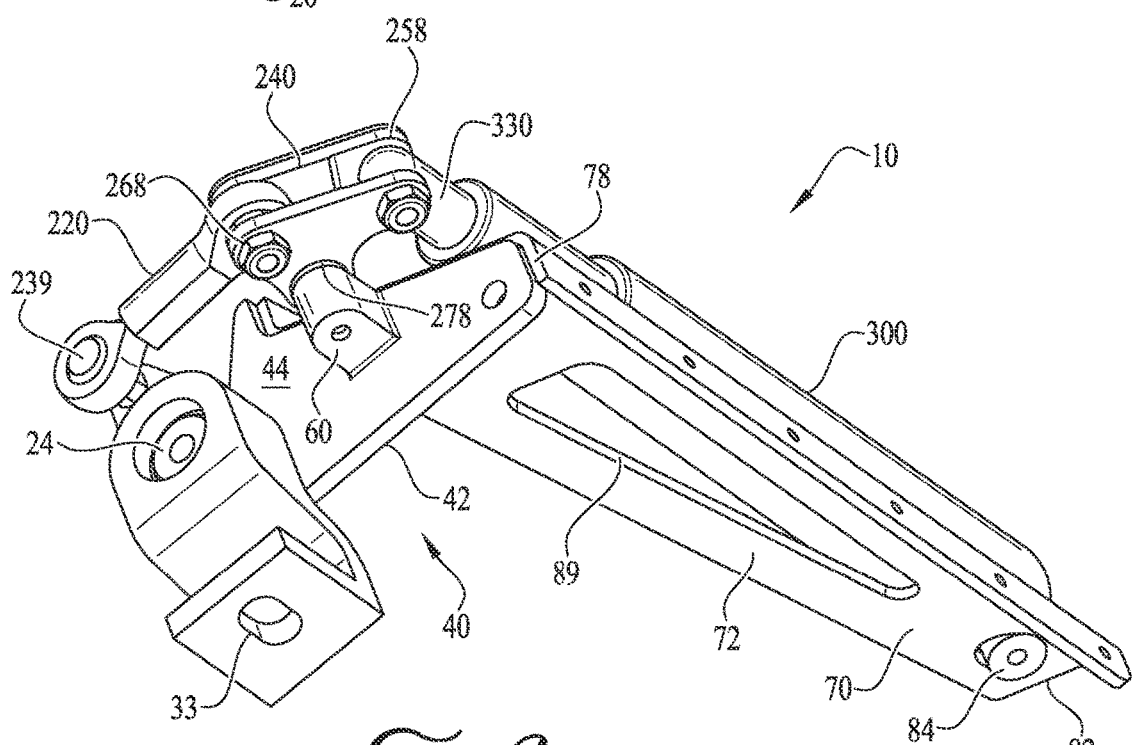
FIG. 3 is a bottom back perspective of the remotely operable light bar tilting system of FIG. 2.

Referring to FIGS. 1, 2 & 3, first attachment base 22 comprises a first support mount 30, a first light bar mount 40, and optionally a first light bar mounting plate 90. Referring to FIG. 1, second attachment base 26 comprises a second support mount 130, a second light bar mount 140, and optionally a second light bar mounting plate 190. First and second support mounts 30, 130 are configured to be secured to a vehicle. First and second light bar mounts 40, 140, are configured to secure light bar 500 to first and second support mounts 30, 130, with first light bar mount 40 also serving as an attachment point for linkage assembly 200 and actuator 300. Where needed first and second light bar mounting plates 90, 190 are configured to be secured to light bar 500 and serve as attachment points to first and second light bar mounts 40, 140, respectively.

Referring to FIGS. 1, 2 & 3, first support mount 30 is comprises a first support mount base 32, a first slot 33, a first bearing mount through hole 34 and a connector through hole 36. Referring to FIGS. 1 & 2, second support mount 130 comprises a second support mount base 132, a second slot 133 and a second bearing mount through hole 134. As shown in FIG. 1, first and second support mounts 30, 130 can be L-shaped in design, with first and second support mount bases 32, 132, including first and second slots 33, 133 respectively, located on the arm portion of the "L" of first and second support mounts 30, 130. First and second bearing mount through holes 34, 134 and a connector through hole 36 are located on the stem portion of the "L" of first and second support mounts 30, 130, perpendicular extending from first and second support mount bases 32, 132, respectively. Although shown extending from one end of first and second support mount bases 32, 132, the stem portions comprising first and second bearing mount through holes 34, 134 and a connector through hole 36 can be positioned to extend from the other side of first and second support mount bases 32, 132, respectively, in an "inverted L-shape" design, or in an interior portion of first and second support mount bases 32, 132, respectively, in an "inverted T-shape" design. First and second slots 33, 133 are located generally directly beneath the respective first and second bearing mount through holes 34, 134 to reduce structural and mechanical stress on remotely operable light bar tilting system 10.

In some embodiments, and as shown in FIG. 1, first and second support mount bases 32, 132 are flat in shape. Generally speaking, however, the arm portion of first and second support mounts 30, 130, comprising first and second support mount bases 32, 132 respectively, are configured to be secured to a vehicle. As such, the shape of first and second support mount bases 32, 132 are designed to fit the contours of the vehicle area where first and second support mounts 30, 130 are to be located. For example, first and second support mount bases 32, 132 can be an arced or curved in shape. In some embodiments, first and second support mount bases 32, 132 are concave in shape where the vehicle area where first and second support mounts 30, 130 are to be located is convex in shape.

In some embodiments, a first support mount base 32 and a second support mount base 132 are a single piece thereby forming a single attachment base. In some embodiments, the placement of the stem portion of first and second support mounts 30, 130 can be spaced apart in a fixed location on this single attachment base. In some embodiments, the placement of the stem portion of first and second support mounts 30, 130 are adjustable to vary the distance between the stem portion of first support mount 30 and the stem portion of second support mount 130 on this single attachment base.

First and second support mounts 30, 130 are mountable to a wide variety of vehicle areas, including, without limitation a frame or roll cage of a vehicle or other appropriate platform.

First and second attachment bases 22, 26 each include an attachment means to fasten first and second attachment bases 22, 26 to a vehicle. In one embodiment, and referring to FIG. 1, first slot 33 of first support mount 30 and second slot 133 of second support mount 130 are used to fasten first and second support mounts 30, 130, respectively, to a vehicle.

As best seen in FIGS. 2 & 3, first light bar mount 40 comprises a first light bar mounting plate 42 and an actuator support 70, which is substantially orthogonally adjacent to first light bar mounting plate 42. Although FIGS. 2 & 3 show actuator support 70 extending approximately orthogonally from first light bar mounting plate 42, the arrangement and configuration of first light bar mount 40 as a whole and these two portions in particular may vary widely according to the application and design constraints, and yet, achieve the same function. First light bar mounting mount 40 rotates with light bar 500 and carries actuator 200 and at least part of linkage assembly 200.

Referring to FIG. 4, first light bar mounting plate 42 has a first side 44 and a second side 46, with first side 44 directionally facing away from light bar 500 and second side 46 directionally facing toward light bar 500 (although this orientation may differ in other embodiments). First side 44 of first light bar mounting plate 42 contains a first hollowed boss 50 for receiving a first bearing 52 with a first ball 55, and a first retaining ring 54 configured to secure the bearing 52 and first ball 55 within the first bearing mount through hole 34, a rocker mount 60 and through hole 64. Rocker mount 60 is a nub protruding from first side 44 and includes a threaded blind hole 62. Rocker mount 60 serves as an attachment point for ternary link 240 of linkage system 200. The first and second pivot joints 38, 138 are aligned or substantially aligned, such that the light bar 500 rotates without binding, chattering, and/or excessive wear to the pivots first and second pivot joints 38, 138 and/or other joints (for example, within the offset and angle ranges recommended by the bearing manufacturer). In some embodiments, the first and second bearings 52, 152 are spherical bearings, where the first and second balls 55, 155 are each inserted into their respective races to permit rotation despite slight misalignment and allows for substantial alignment rather than perfect alignment for smooth operation. Further, in one or more embodiments, the first attachment base 22 and the second attachment base 26 of attachment base 20 can be connected or made integral by a rigid span of material which holds alignment.

In some embodiments, and as shown in FIGS. 2, 3 & 4, rocker mount 60 is oriented approximately perpendicular to the axis of rotation of first pivot joint 38 to define an axis of rotation of ternary link 240 (which may also be described herein as a rocker link or rocker) mounted thereon). In some embodiments, rocker mount 60 is offset a distance from both first pivot joint 38 and a connector joint 239 (also referred to a final joint) of straight link 220 (also referred to a connecting link) and in this orientation, the three generally form a triangle arrangement where connector joint (final joint) 239 is located above pivot joint 38 and rocker mount 60 forms the apex of the triangular arrangement. It should be noted that in this triangular arrangement the three points are situated a distance away from each other, but not necessarily on the same plane when viewed from the end. In addition, alternative orientations are possible, as linkages can be designed to fit and operate in a wide variety of mechanical designs.

With respect to first hollowed boss 50, a proximal end of first hollowed boss 50 extends from first side 44 with first bearing 52 being positioned at a distal end of first hollowed boss 50. First bearing 52 with the first ball 55 therewithin is configured to insert into bearing mount through hole 34 of first support mount 30 and held therein by first retaining ring 54. In some embodiments, and as shown in FIG. 4, second side 46 of first light bar mounting plate 42 directionally faces first side 504 of light bar 500, and when present, second side 46 abuts first light bar mounting plate 90, with first light bar mounting plate 90 engaging first side 504 of light bar 500.

In some embodiments, and referring to FIG. 4, first hollowed boss 50 is formed with an annular step for insertion into first bearing 52 and first ball 55 therewithin. The annular step of first hollow boss 50 acts as a spacer between first light bar mount 40 and first support mount 30. First hollow boss 50 includes a through hole for receiving therethrough a shaft screw 24 (which is in this example a screw with a grip—an unthreaded portion of the shank). When assembled, shaft screw 24 is inserted through first bearing mount through hole 34 of first support mount 30, through first bearing 52 and first ball 55 therewithin, through hole of first hollow boss 50, to be secured either directly to light bar 500 or, when present, shaft screw 24 is secured into a threaded blind hole of a first pivot mounting boss 92 of first light bar mounting plate 90. As assembled, first hollowed boss 50 is supported by first bearing 52 and first ball 55 therewithin to permit rotation of first hollow boss 50 (and first light bar mount 40 as a whole) relative to first support mount 30.

Referring to FIGS. 2, 3 & 4, actuator support 70 it is an elongated metal plate substantially orthogonally adjacent to first light bar mounting plate 42, and configured to extend approximately parallel to top surface 508 (or generally along the length) of light bar 500. Actuator support portion 70 serves to affix one end of actuator 300 to first light bar mount 40 as well as provides support to actuator 300. Actuator support 70 comprises an actuator support body 72 having first surface 74 and a second surface 76, a first side 78 and a second side 80, a proximal end 81, a distal end 82, and a threaded nut 84. First and second sides 78, 80 are opposing and spaced apart from one another and each run the length of actuator support body 72 from proximal end 81 to distal end 82. Proximal end 81 of actuator support portion 70 is abuts first light bar mount 40 and is affixed to first light bar mount 40 by welding, fastening, or the like. At distal end 82 of actuator support portion 70, a threaded nut 84 is affixed to first surface 74. In some embodiments, threaded nut 84 can be a self-clenching nut or a welded nut.

Actuator support body 72 can further comprises a first flange 86 and a second flange 88, such flanges used to increase rigidity of actuator support 70. In some embodiments, and referring to FIG. 4, first flange 86 runs longitudinal along the length of first side 78 of actuator support body 72 from proximal end 81 to distal end 82, extending perpendicular from second surface 76 forming a substantially right angle. Second flange 88 runs longitudinal along the length of second side 80 of actuator support body 72 from proximal end 81 to distal end 82, extending perpendicular from first surface 74 forming a substantially right angle. As such, first and second flanges 86, 88, are substantially parallel to each other, but extend in opposite directions from actuator support 70. First and second flanges 86, 88 are typically formed by a press brake or the like. Actuator support 70 can optionally include a cutout 89, included in order to decrease weight as well as allowing actuator 300 to pass under the top plane of actuator support body 72 when fully extended, enabling a lower location to mount remotely operable light bar tilting system 10 this increasing its low profile appearance.

In some embodiments, actuator support portion 70 can be excluded. In these embodiments, actuator 300 is mounted directly or indirectly to light bar 500, or directly to first light bar mount 40, or mounted to a support that rotates with light bar 500.

As best seen in FIG. 4, second light bar mount 140 comprises a second light bar mounting plate 142 having a first side 144 and a second side 146, with first side 144 directionally facing away from light bar 500 and second side 146 directionally facing toward light bar 500 (although this orientation may differ in other embodiments).

Second side 144 of second light bar mounting plate 142 contains a second hollowed boss 150 for receiving a second bearing 152 with a second ball 155, and a second retaining ring 154 configured to secure the second bearing 152 and second ball 155 within the second bearing mount through hole 134, and through hole 164. A proximal end of second hollowed boss 150 extends from first side 144 with second bearing 152 and second ball 155 therein being positioned at a distal end of second hollowed boss 150. Second bearing 52 and second ball 155 therein are configured to insert into second bearing mount through hole 134 of second support mount 130 and held therein by second retaining ring 154. In some embodiments, and as shown in FIG. 4, second side 146 of second light bar mounting plate 142 directionally faces second side 506 of light bar 500, and when present, second side 146 abuts second light bar mounting plate 190, with second light bar mounting plate 190 engaging second side 506 of light bar 500.

In some embodiments, and referring to FIG. 4, second hollowed boss 150 is formed with an annular step for insertion into the second ball 155 of the second bearing 152. The annular step of second hollow boss 150 acts as a spacer between second light bar mount 140 and second support mount 130. Second hollow boss 150 includes a through hole for receiving therethrough a shaft screw 28 (which is in this example a screw with a grip—an unthreaded portion of the shank). When assembled, shaft screw 28 is inserted through second bearing mount through hole 134 of second support mount 130, through hole of second hollow boss 150, to be secured either directly to light bar 500 or, when present, shaft screw 28 is secured into a threaded blind hole of a second pivot mounting boss 192 of second light bar mounting plate 190. As assembled, second hollowed boss 150 is supported by second bearing 152 to permit rotation of second hollow boss 150 (and second light bar mount 140 as a whole) relative to second support mount 130.

Light bar 500 may include mounting features on each end or other location for mounting light bar 500 on various substrates, such as a threaded hole for receiving a mounting bold or the like. If no appropriate mounting feature is provided on light bar 500, mounting plates 90, 190 can be attached to each end of light bar 500. In some embodiments, and referring to FIGS. 1 & 4, first light bar mounting plate 90 comprises a first pivot mounting boss 92 having a threaded blind hole and a second mounting boss 94 having a threaded blind hole. Similarly, second light bar mounting plate 190 comprises a second pivot mounting boss 192 having a threaded blind hole and a second mounting boss 194 having a threaded blind hole. First and second mounting plates 90, 190 may be reinforced with ribbing to provide structural support, for example radially extending ribs are illustrated about the first pivot mounting boss 92 and the second pivot mounting boss 192. First and second mounting plates 90, 190 are configured to generally conform to a shape of first and second sides 504, 506 of light bar 500. In this manner, first and second mounting plates 90, 190 can be temporality secured to first and second sides 504, 506 of light bar 500 by friction (i.e., a pressure fit) or an adhesive. Alternatively, first and second mounting plates 90, 190 can be secured to first and second sides 504, 506 of light bar 500 using a screw of other fastener. For example, in some embodiments, first mounting plate 90 can be secured to first side 504 of light bar 500 using a first light bar mount screw 66 by inserting first light bar mount screw 66 through hole 64 of first light bar mount plate 42 and screwing into first mounting boss 94. Similarly, second mounting plate 190 can be secured to second side 506 of light bar 500 using a second light bar mount screw 166 by inserting second light bar mount screw 166 through hole 164 of second light bar mount plate 142 and screwing into second mounting boss 194.

Once first and second mounting plates 90, 190 properly position on light bar 500, shaft screws 24, 28 are inserted through first and second bearing mount holes 30, 134 respectively, through hole of first and second hollow boss 50, 150, to be secured into threaded blind hole of first and second pivot mounting bosses 90, 192 respectively. As assembled, light bar 500 is secured to first and second light bar mounts 40, 140, can rotate via first and second pivot joints 38, 138 and be supported by first and second attachment bases 22 and 26.

Remotely operable light bar tilting system disclosed herein comprises a linkage assembly. A linkage assembly disclosed herein comprises one or more links that interconnect with one another in order to transfer the force initiated from an actuator to an attachment base thereby causing a light bar attached therewithin to rotate about a pivot and tilt. In some embodiments, and referring to FIG. 9, linkage assembly 200 comprises straight link 220 and ternary link 240. Straight link 220 couples first attachment base 22 to ternary link 240. Ternary link 240 couples straight link 220 and first light bar mount 40 to actuator 300.

A straight link of a linkage assembly disclosed herein is a rigid, linear structure with eyeholes located at first and second ends. In some embodiments, straight link disclosed herein comprises a single component having a linear body, a first end including a joint portion comprising eyehole, and a second end including a joint portion comprising an eyehole. In some embodiments, straight link disclosed herein comprises two component parts. In these embodiments, and referring to FIG. 4, straight link 220 comprises a male rod component 222 and a female rod component 232. A male rod component 222 comprises a threaded portion 224 at a first end and a joint portion 226 including eyehole 228 at a second end. A female rod component 232 comprises a hollow boss portion 234 at a first end and a joint portion 236 including an eyehole 238 at a second end. The hollow boss portion 234 of female rod component 232 is configured to receive threaded portion 224 of male rod component 222. When assembled, joint portion 226 of male rod component 222 and joint portion 236 of female rod component 232 are at opposite ends of straight link 220. Although, straight link 220 is illustrated and described above as being linear, link 220 is rigid and can vary in shape while still transmitting a push and pull force therethrough, such as an arc shape, an offset shape, or other curvilinear or crooked shape, or other shape dictated by the design for clearance, esthetics or the like.

As discussed above, eyehole 228 of straight link 220 is pressed over ball 216 to secure ball 216 into eyehole 228, thereby forming connector joint (final joint) 239 coupling first attachment base 22 to straight link 220. Referring to FIG. 4, eyehole 238 of straight link 220 is inserted into a straight link clevis 262 of ternary link 240 in a manner that aligns eyehole 238 with straight link clevis 262. A straight link arm screw 264 is then inserted through straight link clevis 262 and eyehole 238 and secured using a straight link arm nut 266, thereby coupling straight link 220 to ternary link 240 and forming a straight link arm joint 268 (also referred to as a third joint). In this way, ternary link 240 and the straight link arm 260 are configured to pivot relative to one another via straight link arm joint (third joint) 268 for the purpose of transmitting and changing the direction of force applied by actuator 300 to straight link 220. However, it should be noted that straight link 220 can be installed in the reversed order so that eyehole 238 is coupled to first attachment base 22 and eyehole 228 is coupled to ternary link 240.

A ternary link of a linkage assembly disclosed herein is a triangularly-shaped structure comprising a plurality of joints. In some embodiments, ternary link disclosed herein comprises a first joint, a second joint, and a third joint. In some embodiments, ternary link disclosed herein comprises an actuator arm joint (first joint) 258, a rocker mount arm joint (second joint) 280, and straight link arm joint (third joint) 268.

In some embodiments, and referring to FIG. 4, ternary link 240 comprises an actuator arm 250 including an actuator clevis 252, a straight link arm 260 including a straight link clevis 262, a rocker mount arm 270 including a rocker pivot hole 272, and a cover plate 290. Ternary link 240 engages in three couplings. In the first coupling, as discussed above, straight link arm screw 264 is inserted through straight link clevis 262 and eyehole 238 and secured using straight link arm nut 266, thereby coupling straight link 220 to ternary link 240 and forming straight link arm joint (third joint) 268.

Figure 7:
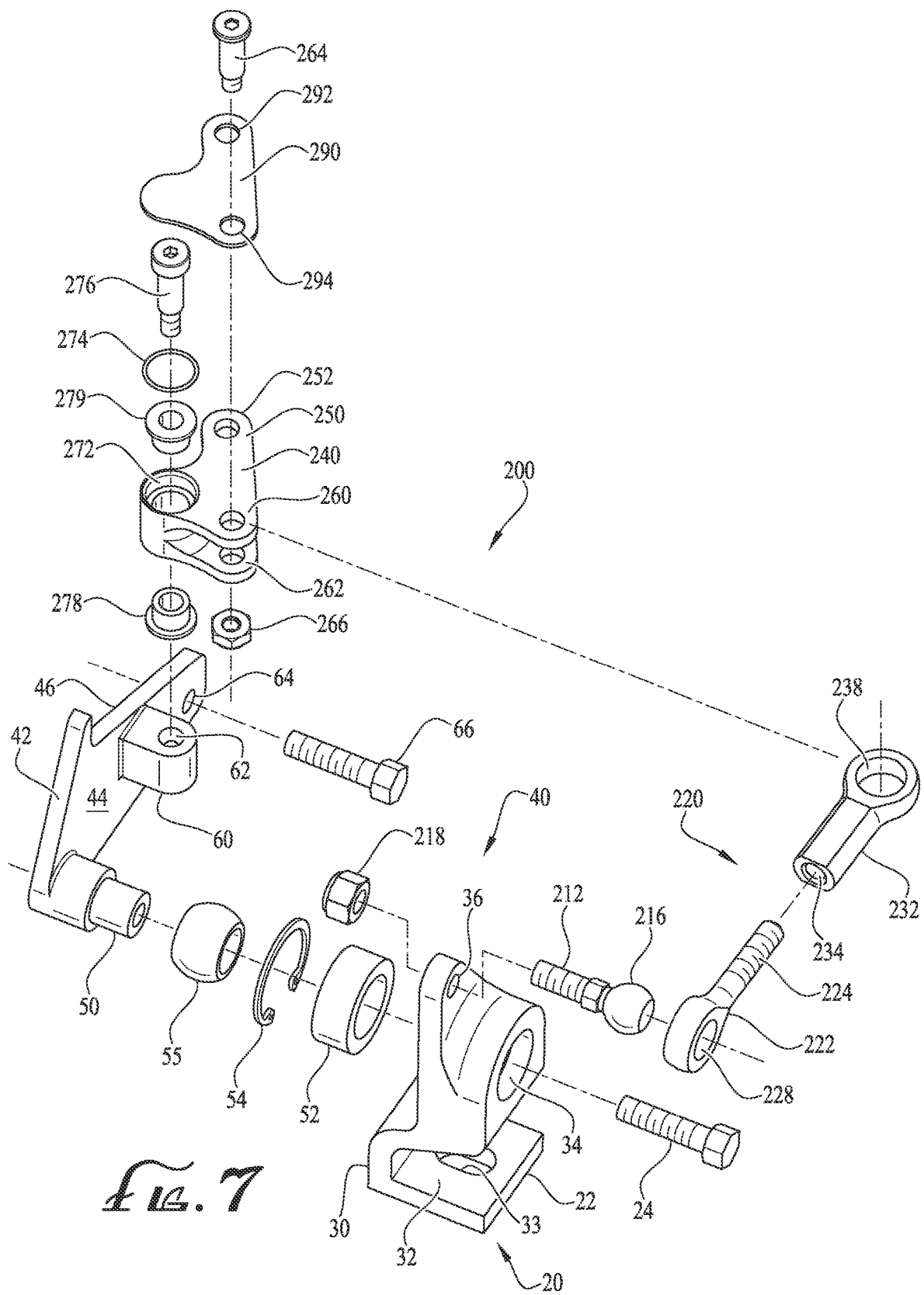
FIG. 7 is an exploded top side perspective of the remotely operable light bar tilting system of FIG. 1, illustrating the linkage assembly with the first light bar mounting plate, illustrated without the actuator, the actuator support, the second attachment base assembly, and without the light bar.

In the second coupling, and referring to FIGS. 4 & 7, ternary link 240 is coupled to rocker mount 60 by aligning rocker pivot through hole 272 with threaded blind hole 62. A two-part rocker mount arm bushing 278, 279 can be pressed into ternary link 240 to permit ternary link 240 to pivot around rocker mount arm screw 276 and create a reduced friction hinge between ternary link 240 and rocker mount 60. A rocker mount arm screw 276 is then inserted through rocker pivot through hole 272 and the through holes of two-part rocker mount arm bushing 278, 279 and then secured to rocker mount 60 by threading rocker mount arm screw 276 into threaded blind hole 62, thereby coupling first light bar mount 40 to ternary link 240 and forming a rocker mount arm joint 280 (also referred to as a second joint). In this way, ternary link 240 is configured to pivot on rocker mount 60 via rocker mount arm joint (second joint) 280 for the purpose of transmitting and changing the direction of force applied by actuator 300 to first and second attachment bases 22, 26.

In the third coupling, ternary link 240 is coupled to actuator 300 by inserting end of piston portion 330 of actuator 300 into actuator clevis 252 of ternary link 240 in a manner that aligns ternary link mounting hole 322 with actuator clevis 252. An actuator arm screw 254 is then inserted through actuator clevis 252 and ternary link mounting hole 322 and secured using actuator arm nut 256, thereby coupling actuator 300 to ternary link 240 and forming an actuator arm joint 258 (also referred to as a first joint). In this way, ternary link 240 and actuator arm 250 are configured to pivot relative to one another via actuator arm joint (first joint) 258 for the purpose of transmitting and changing the direction of force applied by actuator 300 to ternary link 240.

Although linkage assembly 200 is described above and illustrated herein in a specific example embodiment, there are a number of linkage designs that achieve the same or similar transmission of force and/or motion. Thus, the present linkage system 200 is not limited to the illustrated example.

Optionally, cover plate 290 can be fastened overtop ternary link 240 to seal rocker pivot through hole 272, once first light bar mount 40 is coupled to ternary link 240 and rocker mount arm joint (second joint) 280 formed. In some embodiments, a rocker mount arm O-ring 274 is first place on rocker pivot through hole 272 and cover plate 290 is then placed overtop ternary link 240 in a manner that aligns a first though hole 292 with actuator clevis 252 and a second though hole 294 with straight link clevis 252. When actuator arm joint (first joint) 258 and straight link arm joint (third joint) 268 are formed by fastening of actuator arm screw 254 and straight link arm screw 264, respectively, the resulting pressure exerted by cover plate 290 compresses rocker mount arm O-ring 274, thereby forming a seal.

Connector joint 239 can have a variety of configurations, depending on the motion required or other design factors. In some embodiments, connector joint 239 is a ball stud to permit swiveling of linkage assembly 200. Referring to FIG. 4, the portion of the connector joint of the first attachment base comprising a threaded body 212, a ball 214, and a ball stud nut 218. Threaded body 212 has ball 216 at a first end of threaded body 212 and ball stud nut 218 is affixed to an opposite second end of threaded body 212.

As shown in FIGS. 6 & 7, ball stud threaded body 212 is inserted through connector through hole 36 of first support mount 30 and fastened therein by securing opposite second end of threaded body 212 using ball stud nut 218. In alternative embodiments, ball 216 can alternatively be welded or directly threaded into first support mount 30. In this arrangement, ball 214 extends away from first light bar mount 40. An eyehole 228 of straight link 220 in then pressed over ball 214 to secure ball 214 into eyehole 228, thereby forming connector joint (final joint) 239, which in this example is a ball joint.

However, in other embodiments, connector blind hole 36 of first support mount 30 is a threaded blind hole and the opposite second end of threaded body 212 is affixed by fastening threaded body 212 into connector blind hole, dispensing with the need for ball stud nut 218. In still other embodiments, the opposite second end of threaded body 212 is affixed first support mount 30 by welding or by fabrication as a single component, thereby dispensing with the need for ball stud nut 218 or a threaded blind hole.

Although depicted as being positioned directly above the axis of rotation of first pivot joint 38, connector joint (final joint) 239 can be directly below the axis of rotation of first pivot joint 38 or at an offset distance above (or below) the axis of rotation about first pivot joint 38, depending on the requirements of the system, and so long as the offset arrangement creates a lever arm about which the force of actuator 200 acts to smoothly and effectively rotate light bar 500. In some embodiments, the offset distance of connector joint (final joint) 239 from the axis of rotation about first pivot joint 38 can be, e.g., at least 0.25", at least 0.5", at least 0.75", at least 1", at least 1.25", at least 1.5", at least 1.75", at least 2", or at least 3".

Remotely operable light bar tilting system disclosed herein comprises an actuator. An actuator disclosed herein is an apparatus providing the force necessary to control the titling mechanism of a remotely operable light bar tilting system disclosed herein causing a light bar to tilt by rotating about the pivot. An actuator disclosed herein can include, without limitation a hydraulic actuator, a pneumatic actuator, an electric actuator, a twisted and coiled (TCP)/supercoiled polymer (SCP) actuator, a thermal actuator, a magnetic actuator, or a mechanical actuator. Referring to FIGS. 1-3, 6-5 & 8-11, actuator 300 is positioned parallel to and along the length of light bar 500, conferring a low-profile design. In some embodiments, and referring to FIGS. 1-6 & 8-12, actuator 300 is an electric actuator commonly available and known in the art.

Actuator 300 can further comprise a control system. A control system disclosed herein includes a variety of components, depending on the actuator chosen and its internal components. In some embodiments, a control system of an actuator 300 include, without limitation, relays, switches, and the like. In addition, actuator 300 typically includes a power source as this apparatus is designed to transform an input signal (like an electrical signal) into some form of kinetic energy causing motion. In some embodiments, actuator 300 includes a power source dedicated to actuator 300. In some embodiments, actuator 300 relies on a power source already present in a vehicle, such as, e.g., a 12-volt DC battery provided in most vehicles.

In some embodiments, control system disclosed herein comprises two momentary switches mounted to a steering wheel of a vehicle and positioned to be operated by the left and right thumbs of an operator of the vehicle. For example, one switch can be positioned closest to the right-hand driving position and designed to be operated by the right thumb of an operator. This right-thumb switch can be configured to tilt light bar 500 up by any tilt angle between the minimum and maximum. The degree of tilt can be controlled by limit switches mounted to the remotely operable light bar tilting system 10 or light bar 500, or other position, such that the limit switches are contacted at these maximum angles, or can be controlled by setting the limits in the internal or external circuitry of a control system. In addition, a second switch can be positioned closest to the left-hand driving position and designed to be operated by the left thumb of an operator. This left-thumb switch can be configured to tilt light bar 500 down by any tilt angle between the minimum and maximum. The example maximum upward tilt angle α with the example maximum downward tilt angle β illustrate the upper and lower limits of light bar 500 rotation. Using the switches, the operator can set the tilt position at any angle within this range.

In some embodiments, actuator 300 is a linear actuator 320 comprising housing 322 including sleeve portion 324 which serves as an outer tube, and piston portion 330 which serves as an output rod that telescopically moves in and out of sleeve portion 324 under the control of an electrical motor driven lead screw, under pneumatic or hydraulic pressure, under magnetic force, or other known means to impart a positional displacement. Although FIGS. 1-12 depict actuator 300 as linear actuator 320, other actuator designs, including, without limitation, a stepper motor or other rotational actuator, solenoids, or any device that includes first portion 304 and second portion 310 that are movable relative to one another, to produce a rotation or positional displacement of some sort can be used in a remotely operable light bar tilting system disclosed herein. In some embodiments, a more compact stepper motor might be mounted directly to first light bar mount 40 at rocker mount 60 (or in place of the rocker mount 60) to impart a rotation on ternary link 240 (or other link or linkage assembly).

The exact mounting arrangement of actuator 300 can vary according to design requirements and the type of actuator used. In some embodiments, first portion 304 of actuator 300 is coupled to first light bar mount 40 and second portion 310 of actuator 300 is coupled to ternary link 240. In these embodiments, end of second portion 310 of actuator 300 is inserted into actuator clevis 252 of ternary link 240 in a manner that aligns ternary link mounting hole 322 with actuator clevis 252. An actuator arm screw 254 is then inserted through actuator clevis 252 and ternary link mounting hole 312 and secured using actuator arm nut 256, thereby coupling end of second portion 310 to ternary link 240 and forming actuator arm joint (first joint) 258. End of first portion 304 of actuator 300 is coupled to first light bar mount 40 using actuator support mounting screw 308 which is inserted through actuator support mounting hole 306 of actuator 300 and secured to actuator support portion 70 using threaded nut 84, thereby coupling end of first portion 304 to first light bar mount 40 and forming actuator joint 314. Actuator joint 314 can permit at least some degree of rotation of actuator 300 about actuator joint 314 using, for example, a clevis joint provided on many standard actuators. However, it should be noted that actuator 300 can be installed in the reversed order so that second portion 310 of actuator 300 is coupled to first light bar mount 40 and first portion 304 of actuator 300 is coupled to ternary link 240.

In some embodiments, sleeve portion 324 of linear actuator 320 is coupled to first light bar mount 40 and piston portion 330 of linear actuator 320 is coupled to ternary link 240. In these embodiments, and referring to FIGS. 1-6 & 8-11, end of piston portion 330 of linear actuator 320 is inserted into actuator clevis 252 of ternary link 240 in a manner that aligns ternary link mounting hole 332 with actuator clevis 252. An actuator arm screw 254 is then inserted through actuator clevis 252 and ternary link mounting hole 332 and secured using actuator arm nut 256, thereby coupling end of piston portion 330 to ternary link 240 and forming actuator arm joint (first joint) 258. End of sleeve portion 324 of linear actuator 320 is coupled to first light bar mount 40 using actuator support mounting screw 328 which is inserted through actuator support mounting hole 326 of linear actuator 320 and secured to actuator support portion 70 using threaded nut 84, thereby coupling end of sleeve portion 324 to first light bar mount 40 and forming actuator joint 334. Actuator joint 334 can permit at least some degree of rotation of linear actuator 320 about actuator joint 334 using, for example, a clevis joint provided on many standard actuators. However, it should be noted that linear actuator 320 can be installed in the reversed order so that piston portion 330 of linear actuator 320 is coupled to first light bar mount 40 and sleeve portion 324 of linear actuator 320 is coupled to ternary link 240.

Looking now at FIGS. 8 & 9, remotely operable light bar tilting system 10 is illustrated with light bar 500 tilted in the upward direction (or clockwise as viewed from FIG. 9) by an angle α. Looking back at FIG. 1, front face 502 of light bar 500 is facing straight forward, with no tilt and planar perpendicular to a level horizontal surface. Such orientation would aim light emitting elements 510 of front face 502 straight forward. Again, referring to FIGS. 8 & 9, actuator 300 has pushed piston portion 320 outward in the direction indicated by arrow 340. Ternary link 240 is rotated clockwise, as viewed in FIG. 9 and indicated by arrow 296, pushing actuator arm joint (first joint) 258 away from first light bar mount 40 in an accurate path about rocker mount arm joint (second joint) 280, and moving straight link arm joint (third joint) 268 closer to first light bar mount 40. Because straight link 220 is rigid and connected to first support mount 30, and connector joint (final joint) 239 is offset a distance d1 above first pivot joint 38 and offset a distance d2 forward to first pivot joint 38, a force transmitted through straight link 220 produces a torque about first pivot joint 38, which results in rotation of first light bar mount 40 and attached light bar 500. Further, the location of rocker mount 60, or more particularly, rocker mount arm joint (second joint) 280, relative to first pivot joint 38 additionally aids in rotating first light bar mount 40 in response to movement of piston portion 320 of actuator 300. Rocker mount arm joint (second joint) 280 is offset a distance d3 behind first pivot joint 38 and an offset a distance d4 above first pivot joint 38. These distances can vary according to the design requirements, such as the maximum force produced by the actuator, the weight of light bar 500, the conditions under which the system will be operated, and so on. As can be seen in FIG. 3, first support mount 30 is bolted to substrate S in one of many available mounting options.

Figure 10:
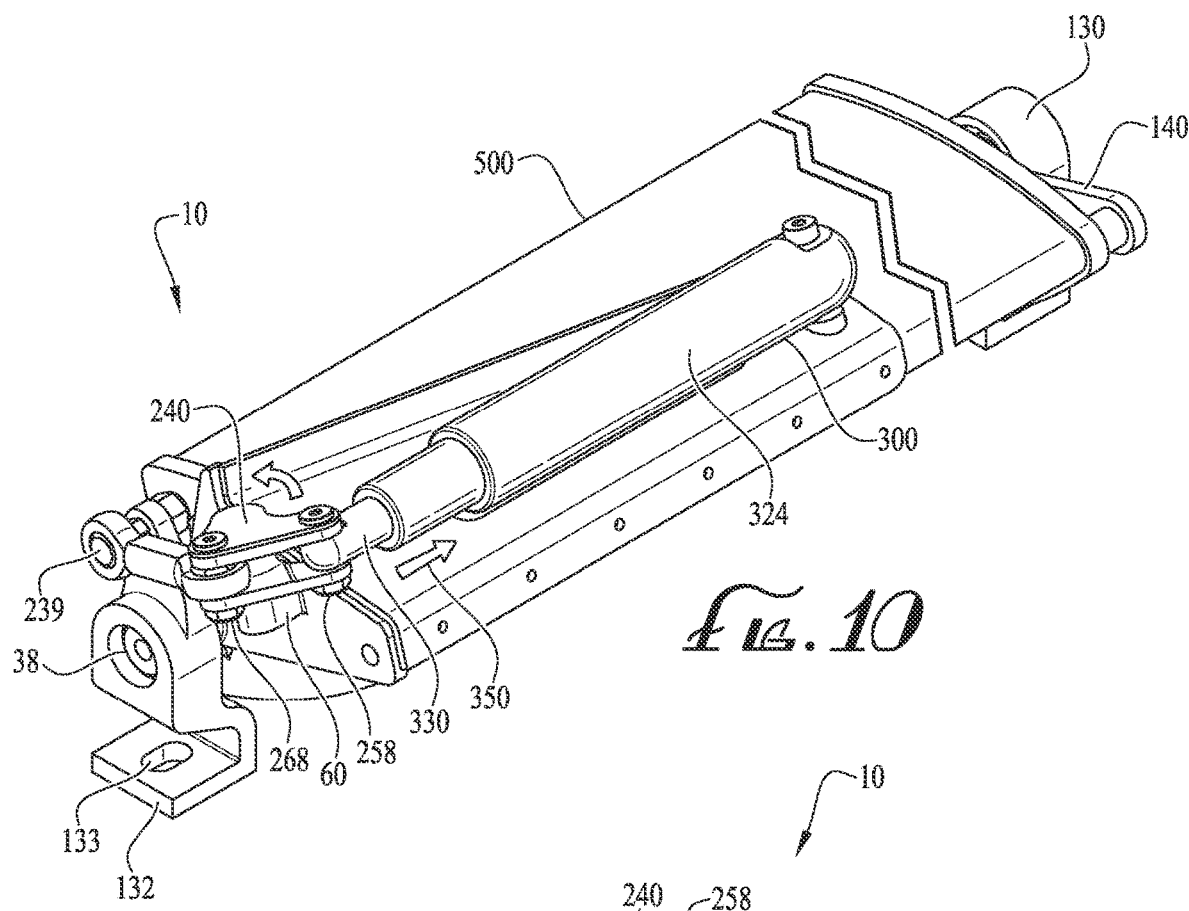
FIG. 10 is a top back perspective of the remotely operable light bar tilting system of FIG. 1, illustrating the light bar tilted down by an angle β.
Figure 11:
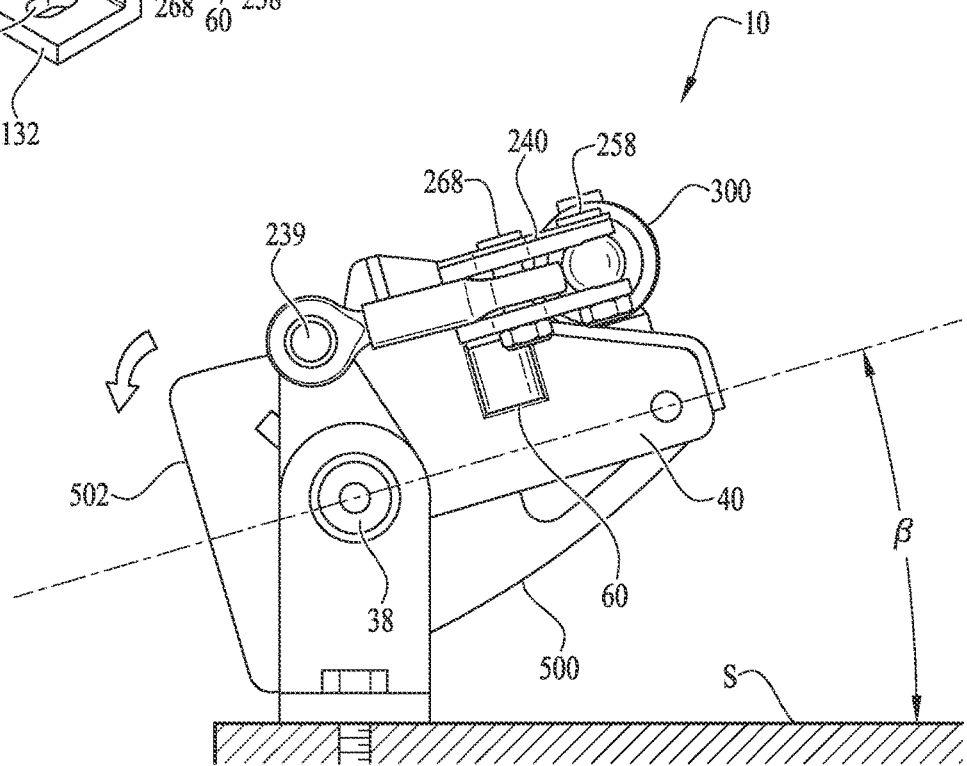
FIG. 11 is a side view of the remotely operable light bar tilting system of FIG. 10.

Now, looking at FIGS. 10 & 11, remotely operable light bar tilting system 10 is illustrated with light bar 500 tilted in the downward direction (or counterclockwise as viewed from FIG. 6) by an angle β, in a manner opposite to that described above in reference to FIGS. 3 & 4. Here, actuator 300 has pulled or retracted piston portion 320 inward in the direction indicated by arrow 350. Ternary link 240 is rotated counterclockwise, as viewed in FIG. 5, pulling actuator arm joint (first joint) 258 toward first light bar mount 40 in an accurate path about rocker mount arm joint (second joint) 280, and moving straight arm joint (third joint) 268 further from first light bar mount 40. The angles α and β are approximately 15° each, for a total tilt angle of 30°. Of course, the tilt angle can be configured to be greater than or less than 30°.

Although present remotely operable light bar tilting system 10 is illustrated and described herein as being attached to light bar 500, certain aspects of the design can also be directly attached or connected to housing or other portion of light bar 500 to achieve the same or similar kinematic effect. For example, as illustrated in FIG. 12, first light bar mount 40 can be excluded. In these embodiments, sleeve portion 314 of actuator 300 and rocker mount arm 270 of ternary link 240 are attached to light bar 500 directly to form actuator joint 324 and rocker mount arm joint (second joint) 280, respectively, rather than through first light bar mount 40. In this example, rocker mount 60 extends directly from the first light bar mounting plate or other portion of the light bar 500. This might be the case if light bar 500 were to be manufactured with remotely operable light bar tilting system 10 integrated, rather than as an after-market kit, which may or may not require this support. Further, the described arrangement of ternary link 240 is one of a number of linkage designs which can change the direction the actuator force in a push/pull arrangement for tilting light bar 500.

The present remotely operable light bar tilting system 10 provides a means to quickly adjust the light angle on the fly, when racing off-road or under any conditions, to view obstacles and conditions just in front of the vehicle or far ahead. The design is robust and stable under rough conditions, while allowing for fast changes while driving.

Aspects of the present specification may also be described by the following embodiments:

1. A remotely operated light bar tilting system comprising: a first attachment base with a first pivot joint, the first attachment base being configured to support at least part of a light bar at the first pivot joint, the first pivot joint permitting rotation of the light bar relative to the first attachment base; an actuator having a first portion and a second portion, the second portion being movable relative to the first portion, the actuator being configured to be operably coupled with the light bar by the first portion; and a linkage assembly connecting the actuator to the first attachment base, the linkage assembly being coupled to the second portion of the actuator at a first joint and coupled to the first attachment base at a final joint, wherein, upon actuation, the first portion of the actuator moves relative to the second portion to transmit a force through the linkage to cause the light bar to rotate, the actuator wholly and at least a part of the linkage rotating about the pivot with the light bar.

2. The remotely operated light bar tilting system of embodiment 1 further comprising a first support mount configured to rotate about the first pivot joint with the light bar, the first portion of the actuator being coupled with the light bar through the first support mount.

3. The remotely operated light bar tilting system of embodiment 1 or 2, wherein the linkage assembly comprises: a ternary link coupled with the second portion of the actuator at the first joint, the ternary link coupled with the first support mount at a second joint; and a straight link coupled by a first end to the ternary link at a third joint, the straight link pivotally coupled by a second end to the first attachment base by the final joint, wherein, upon actuation, movement of the second portion of the actuator relative to the first portion causes the ternary link to rotate about the second joint such that the straight link applies the force to the first attachment base at the final joint.

4. The remotely operated light bar tilting system of any one of embodiments 1-3, wherein the first pivot joint of the first attachment base comprises a shaft screw about which the first support mount and the light bar rotate, the first support mount comprises a first light bar mount having a through hole configured to receive the shaft screw therethrough and a rocker mount configured to couple to the ternary link at the second joint to permit rotation of the ternary link relative to and about the second joint and to the rocker mount.

5. The remotely operated light bar tilting system of any one of embodiments 2-4, wherein the first support mount comprises a first light bar mount configured to be positioned at an end of the light bar and an actuator support extending from the first light bar mount, the actuator support configured to extend along at least a portion of a light bar length with the first portion of the actuator being coupled to the actuator support at a distal location.

6. The remotely operated light bar tilting system of any one of embodiments 1-5 further comprising a second attachment base with a second pivot joint aligned with the first pivot joint, second pivot joint being configured to at least partially support the light bar in conjunction with the first pivot joint of the first attachment base.

7. The remotely operated light bar tilting system of any one of embodiments 1-6 further comprising a second support mount configured to rotate about the second pivot with the light bar.

8. The remotely operated light bar tilting system of any one of embodiments 1-7, wherein the final joint is located an offset distance from the first pivot joint sufficient to apply a torque about the first pivot joint through the linkage assembly.

9. The remotely operated light bar tilting system of any one of embodiments 1-8, wherein the actuator is actuated through a control system configured to rotate the light bar selectively in a first rotational direction and a second rotational direction.

10. The remotely operated light bar tilting system of any one of embodiments 1-9, wherein the actuator is a linear actuator.

11. The remotely operated light bar tilting system of any one of embodiments 2-10, wherein the first support mount is attached to the light bar.

12. A remotely operated light bar tilting system comprising: a first attachment base with a first pivot joint, the first pivot joint configured to support at least part of the light bar and permit rotation of the light bar relative to the first attachment base about the first pivot joint; a first support mount configured to rotate about the first pivot joint with the light bar; an actuator having a first portion and a second portion, the second portion being movable relative to the first portion, the actuator being coupled to the first support mount by the first portion; a straight link having a first end opposite a second end; and a ternary link pivotally coupled to the first support mount at a joint, the ternary link being connected to the second portion of the actuator and to the first end of the straight link such that motion of the second portion of the actuator rotates the ternary link about the joint to apply a force on the first attachment base through the straight link connected to the first attachment base by the second end at a final joint.

13. The remotely operated light bar tilting system of embodiment 12, wherein the ternary link is coupled with the second portion of the actuator at a first joint, and the ternary link is coupled with the first end of the straight link at a third joint.

14. The remotely operated light bar tilting system of embodiment 12 or 13 further comprising a second attachment base with a second pivot joint aligned with the first pivot joint, the second pivot joint configured to at least partially support the light bar in conjunction with the first pivot joint of the first attachment base.

15. The remotely operated light bar tilting system of any one of embodiments 12-14, wherein the final joint is located an offset distance from the first pivot joint sufficient to apply a torque about the first pivot joint through the straight link.

16. The remotely operated light bar tilting system of any one of embodiments 12-15, wherein the actuator is actuated through a control system configured to rotate the light bar selectively in a first rotational direction and a second rotational direction opposite the first rotational direction.

17. The remotely operated light bar tilting system of any one of embodiments 12-16, wherein the actuator is a linear actuator.

18. The remotely operated light bar tilting system of any one of embodiments 12-17, wherein the first pivot joint of the first attachment base comprises a shaft screw about which the first support mount and light bar rotate, the first support mount comprises a first light bar mount having a through hole configured to receive the shaft screw therethrough and a rocker mount configured to couple the ternary link at the joint to permit rotation of the ternary link relative to and about the joint and to the rocker mount.

19. A remotely operated light bar tilting system comprising: a first attachment base, the first attachment base comprising a first support mount and a first light bar mount, the first light bar mount coupled to the first support mount by a first pivot joint, the first light bar mount being configured to support at least part of a light bar at the first pivot joint, the first pivot joint permitting rotation of the light bar relative to the first support mount; an actuator having a first portion and a second portion, the second portion being movable relative to the first portion, the actuator being configured to be operably coupled with the light bar by the first portion; and a linkage assembly connecting the actuator to the first attachment base, the linkage assembly being coupled to the second portion of the actuator at a first joint and coupled to the first attachment base at a final joint, wherein, upon actuation, the first portion of the actuator moves relative to the second portion to transmit a force through the linkage assembly to cause the light bar to rotate, the actuator wholly and at least a part of the linkage assembly rotating about the pivot with the light bar.

20. The remotely operated light bar tilting system of embodiment 19, wherein the first attachment base further comprises a first light bar mounting plate, the first light bar mounting plate being attached to the first light bar mount and configured to support at least part of a light bar.

21. The remotely operated light bar tilting system of embodiment 19 or 20, wherein the linkage assembly comprises a straight link and a ternary link.

22. The remotely operated light bar tilting system of embodiment 21, wherein the ternary link is coupled with the second portion of the actuator at the first joint, the ternary link being coupled with the rocker mount at a second joint; the straight link is coupled by a first end to the ternary link at a third joint, the straight link being pivotally coupled by a second end to the first attachment base by the final joint; wherein, upon actuation, movement of the second portion of the actuator relative to the first portion causes the ternary link to rotate about the second joint such that the straight link applies the force to the first attachment base at the final joint.

23. The remotely operated light bar tilting system of any one of embodiments 19-22, further comprising a second attachment base, the second attachment base comprising a second support mount and a second light bar mount, the second light bar mount coupled to the second support mount by a second pivot joint, the second light bar mount being configured to support at least part of a light bar at the second pivot joint, the second pivot joint aligned with the first pivot joint to permit rotation of the light bar relative to the second support mount.

24. The remotely operated light bar tilting system of embodiment 23, wherein the second attachment base further comprises a second light bar mounting plate, the second light bar mounting plate being attached to the second light bar mount and configured to support at least part of a light bar.

25. The remotely operated light bar tilting system of any one of embodiments 19-24, wherein the first portion of the actuator is directly coupled to the light bar.

26. The remotely operated light bar tilting system of any one of embodiments 19-24, wherein first light bar mount comprises a light bar mounting plate and an actuator support, the actuator support orthogonally adjacent to the first light bar mounting plate and configured to extend approximately parallel to a top surface of the light bar.

27. The remotely operated light bar tilting system of embodiments 19-24 or 26, wherein the first portion of the actuator is indirectly coupled to the light bar via the actuator support.

28. The remotely operated light bar tilting system of embodiment 26 or 27, wherein the light bar mounting plate has a first side facing away from the light bar a second side facing toward the light bar, the first side comprising a rocker mount.

29. The remotely operated light bar tilting system of embodiment 28, wherein the linkage assembly comprises a straight link and a ternary link.

30. The remotely operated light bar tilting system of embodiment 29, wherein the ternary link is coupled with the second portion of the actuator at the first joint, the ternary link being coupled with the rocker mount at a second joint; the straight link is coupled by a first end to the ternary link at a third joint, the straight link being pivotally coupled by a second end to the first attachment base by the final joint; wherein, upon actuation, movement of the second portion of the actuator relative to the first portion causes the ternary link to rotate about the second joint such that the straight link applies the force to the first attachment base at the final joint.

31. The remotely operated light bar tilting system of embodiment 29 or 30, further comprising the light bar, wherein the light bar includes a rocker mount, wherein the first portion of the actuator is directly coupled to the light bar, and wherein the second portion of the actuator is directly coupled to the ternary link.

32. A remotely operated light bar tilting system comprising: a light bar; a first attachment base, the first attachment base comprising a first support mount and a first light bar mount, the first light bar mount coupled to the first support mount by a first pivot joint, the first light bar mount being configured to support at least part of the light bar at the first pivot joint, the first pivot joint permitting rotation of the light bar relative to the first support mount; an actuator having a first portion and a second portion, the second portion being movable relative to the first portion, the actuator being configured to be operably coupled with the light bar by the first portion; and a linkage assembly connecting the actuator to the first attachment base, the linkage assembly being coupled to the second portion of the actuator at a first joint, coupled to the light bar at a second joint, and coupled to the first attachment base at a final joint, wherein, upon actuation, the first portion of the actuator moves relative to the second portion to transmit a force through the linkage assembly to cause the light bar to rotate, the actuator wholly and at least a part of the linkage assembly rotating about the pivot with the light bar.

In closing, foregoing descriptions of embodiments of the present invention have been presented for the purposes of illustration and description. It is to be understood that, although aspects of the present invention are highlighted by referring to specific embodiments, one skilled in the art will readily appreciate that these described embodiments are only illustrative of the principles comprising the present invention. As such, the specific embodiments are not intended to be exhaustive or to limit the invention to the precise forms disclosed. Therefore, it should be understood that embodiments of the disclosed subject matter are in no way limited to a particular element, compound, composition, component, article, apparatus, methodology, use, protocol, step, and/or limitation described herein, unless expressly stated as such.

In addition, groupings of alternative embodiments, elements, steps and/or limitations of the present invention are not to be construed as limitations. Each such grouping may be referred to and claimed individually or in any combination with other groupings disclosed herein. It is anticipated that one or more alternative embodiments, elements, steps and/or limitations of a grouping may be included in, or deleted from, the grouping for reasons of convenience and/or patentability. When any such inclusion or deletion occurs, the specification is deemed to contain the grouping as modified, thus fulfilling the written description of all Markush groups used in the appended claims.

Furthermore, those of ordinary skill in the art will recognize that certain changes, modifications, permutations, alterations, additions, subtractions and sub-combinations thereof can be made in accordance with the teachings herein without departing from the spirit of the present invention. Furthermore, it is intended that the following appended claims and claims hereafter introduced are interpreted to include all such changes, modifications, permutations, alterations, additions, subtractions and sub-combinations as are within their true spirit and scope. Accordingly, the scope of the present invention is not to be limited to that precisely as shown and described by this specification.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

The words, language, and terminology used in this specification is for the purpose of describing particular embodiments, elements, steps and/or limitations only and is not intended to limit the scope of the present invention, which is defined solely by the claims. In addition, such words, language, and terminology are to be understood not only in the sense of their commonly defined meanings, but to include by special definition in this specification structure, material or acts beyond the scope of the commonly defined meanings. Thus, if an element, step or limitation can be understood in the context of this specification as including more than one meaning, then its use in a claim must be understood as being generic to all possible meanings supported by the specification and by the word itself.

The definitions and meanings of the elements, steps or limitations recited in a claim set forth below are, therefore, defined in this specification to include not only the combination of elements, steps or limitations which are literally set forth, but all equivalent structure, material or acts for performing substantially the same function in substantially the same way to obtain substantially the same result. In this sense it is therefore contemplated that an equivalent substitution of two or more elements, steps or limitations may be made for any one of the elements, steps or limitations in a claim set forth below or that a single element, step or limitation may be substituted for two or more elements, steps or limitations in such a claim. Although elements, steps or limitations may be described above as acting in certain combinations and even initially claimed as such, it is to be expressly understood that one or more elements, steps or limitations from a claimed combination can in some cases be excised from the combination and that the claimed combination may be directed to a sub-combination or variation of a sub-combination. As such, notwithstanding the fact that the elements, steps and/or limitations of a claim are set forth below in a certain combination, it must be expressly understood that the invention includes other combinations of fewer, more or different elements, steps and/or limitations, which are disclosed in above even when not initially claimed in such combinations. Furthermore, insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Accordingly, the claims are thus to be understood to include what is specifically illustrated and described above, what is conceptually equivalent, what can be obviously substituted and also what essentially incorporates the essential idea of the invention.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as, e.g., "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as, e.g., "comprise" and "comprises", and equivalent open-ended transitional phrases thereof like "including," "containing" and "having", encompass all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as, e.g., "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising"

is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim, whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such, the embodiments described herein or so claimed with the phrase "comprising" expressly and unambiguously provide description, enablement, and support for the phrases "consisting essentially of" and "consisting of."

Lastly, all patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard is or should be construed as an admission that the inventors are not entitled to antedate such disclosure by virtue of prior invention or for any other reason. All statements as to the date or representation as to the contents of these documents are based on the information available to the applicant and do not constitute any admission as to the correctness of the dates or contents of these documents.

The invention claimed is:

1. A remotely operated light bar tilting system comprising:
    a first attachment base with a first pivot joint, the first attachment base being configured to support at least part of a light bar at the first pivot joint, the first pivot joint permitting rotation of the light bar relative to the first attachment base;
    an actuator having a first portion and a second portion, the second portion being movable relative to the first portion, the actuator being configured to be operably coupled with the light bar by the first portion; and
    a linkage assembly connecting the actuator to the first attachment base, the linkage assembly being coupled to the second portion of the actuator at a first joint and coupled to the first attachment base at a final joint;
    wherein, upon actuation, the first portion of the actuator moves relative to the second portion to transmit a force through the linkage to cause the light bar to rotate, the actuator wholly and at least a part of the linkage rotating about the pivot with the light bar.

2. The remotely operated light bar tilting system of claim 1 further comprising a first support mount configured to rotate about the first pivot joint with the light bar, the first portion of the actuator being coupled with the light bar through the first support mount.

3. The remotely operated light bar tilting system of claim 2, wherein the linkage assembly comprises:
    a ternary link coupled with the second portion of the actuator at the first joint, the ternary link coupled with the first support mount at a second joint; and
    a straight link coupled by a first end to the ternary link at a third joint, the straight link pivotally coupled by a second end to the first attachment base by the final joint;
    wherein, upon actuation, movement of the second portion of the actuator relative to the first portion causes the ternary link to rotate about the second joint such that the straight link applies the force to the first attachment base at the final joint.

4. The remotely operated light bar tilting system of claim 3, wherein the first pivot joint of the first attachment base comprises a shaft screw about which the first support mount and the light bar rotate, the first support mount comprises a first light bar mount having a through hole configured to receive the shaft screw therethrough and a rocker mount configured to couple to the ternary link at the second joint to permit rotation of the ternary link relative to and about the second joint and to the rocker mount.

5. The remotely operated light bar tilting system of claim 2, wherein the first support mount comprises a first light bar mount configured to be positioned at an end of the light bar and an actuator support extending from the first light bar mount, the actuator support configured to extend along at least a portion of a light bar length with the first portion of the actuator being coupled to the actuator support at a distal location.

6. The remotely operated light bar tilting system of claim 1 further comprising a second attachment base with a second pivot joint aligned with the first pivot joint, second pivot joint being configured to at least partially support the light bar in conjunction with the first pivot joint of the first attachment base.

7. The remotely operated light bar tilting system of claim 6 further comprising a second support mount configured to rotate about the second pivot with the light bar.

8. The remotely operated light bar tilting system of claim 1, wherein the final joint is located an offset distance from the first pivot joint sufficient to apply a torque about the first pivot joint through the linkage assembly.

9. The remotely operated light bar tilting system of claim 1, wherein the actuator is actuated through a control system configured to rotate the light bar selectively in a first rotational direction and a second rotational direction.

10. The remotely operated light bar tilting system of claim 2, wherein the first support mount is attached to the light bar.

11. A remotely operated light bar tilting system comprising:
    a first attachment base, the first attachment base comprising a first support mount and a first light bar mount, the first light bar mount coupled to the first support mount by a first pivot joint, the first light bar mount being configured to support at least part of a light bar at the first pivot joint, the first pivot joint permitting rotation of the light bar relative to the first support mount;
    an actuator having a first portion and a second portion, the second portion being movable relative to the first portion, the actuator being configured to be operably coupled with the light bar by the first portion; and
    a linkage assembly connecting the actuator to the first attachment base, the linkage assembly being coupled to the second portion of the actuator at a first joint and coupled to the first attachment base at a final joint,
    wherein, upon actuation, the first portion of the actuator moves relative to the second portion to transmit a force through the linkage assembly to cause the light bar to rotate, the actuator wholly and at least a part of the linkage assembly rotating about the pivot with the light bar.

12. The remotely operated light bar tilting system of claim 11, wherein the first attachment base further comprises a first light bar mounting plate, the first light bar mounting plate being attached to the first light bar mount and configured to support at least part of a light bar.

13. The remotely operated light bar tilting system of claim 11, wherein the linkage assembly comprises a straight link and a ternary link,
the ternary link being coupled with the second portion of the actuator at the first joint, the ternary link being coupled with the rocker mount at a second joint; and
the straight link being coupled by a first end to the ternary link at a third joint, the straight link being pivotally coupled by a second end to the first attachment base by the final joint;
wherein, upon actuation, movement of the second portion of the actuator relative to the first portion causes the ternary link to rotate about the second joint such that the straight link applies the force to the first attachment base at the final joint.

14. The remotely operated light bar tilting system of claim 11, further comprising a second attachment base, the second attachment base comprising a second support mount and a second light bar mount, the second light bar mount coupled to the second support mount by a second pivot joint, the second light bar mount being configured to support at least part of a light bar at the second pivot joint, the second pivot joint aligned with the first pivot joint to permit rotation of the light bar relative to the second support mount.

15. The remotely operated light bar tilting system of claim 14, wherein the second attachment base further comprises a second light bar mounting plate, the second light bar mounting plate being attached to the second light bar mount and configured to support at least part of a light bar.

16. The remotely operated light bar tilting system of claim 11, wherein the first portion of the actuator is directly coupled to the light bar or indirectly coupled to the light bar via the actuator support.

17. The remotely operated light bar tilting system of claim 11, wherein first light bar mount comprises a light bar mounting plate and an actuator support, the actuator support orthogonally adjacent to the first light bar mounting plate and configured to extend approximately parallel to a top surface of the light bar.

18. The remotely operated light bar tilting system of claim 17, wherein the light bar mounting plate has a first side facing away from the light bar a second side facing toward the light bar, the first side comprising a rocker mount.

19. The remotely operated light bar tilting system of claim 18, wherein the linkage assembly comprises a straight link and a ternary link,
the ternary link being coupled with the second portion of the actuator at the first joint, the ternary link being coupled with the rocker mount at a second joint; and
the straight link being coupled by a first end to the ternary link at a third joint, the straight link being pivotally coupled by a second end to the first attachment base by the final joint;
wherein, upon actuation, movement of the second portion of the actuator relative to the first portion causes the ternary link to rotate about the second joint such that the straight link applies the force to the first attachment base at the final joint.

20. The remotely operated light bar tilting system of claim 19, further comprising the light bar, wherein the light bar includes a rocker mount, wherein the first portion of the actuator is directly coupled to the light bar, and wherein the second portion of the actuator is directly coupled to the ternary link.

21. A remotely operated light bar tilting system comprising:
a light bar;
a first attachment base, the first attachment base comprising a first support mount and a first light bar mount, the first light bar mount coupled to the first support mount by a first pivot joint, the first light bar mount being configured to support at least part of the light bar at the first pivot joint, the first pivot joint permitting rotation of the light bar relative to the first support mount;
an actuator having a first portion and a second portion, the second portion being movable relative to the first portion, the actuator being configured to be operably coupled with the light bar by the first portion; and
a linkage assembly connecting the actuator to the first attachment base, the linkage assembly being coupled to the second portion of the actuator at a first joint, coupled to the light bar at a second joint, and coupled to the first attachment base at a final joint,
wherein, upon actuation, the first portion of the actuator moves relative to the second portion to transmit a force through the linkage assembly to cause the light bar to rotate, the actuator wholly and at least a part of the linkage assembly rotating about the pivot with the light bar.

* * * * *